US012663602B2

(12) United States Patent
De Jong et al.

(10) Patent No.: US 12,663,602 B2
(45) Date of Patent: Jun. 23, 2026

(54) OPTICAL DEVICES HAVING EXTERNALLY FIELD-CONFIGURABLE SPLITTING RATIOS AND METHODS OF USING THE SAME

(71) Applicant: CORNING RESEARCH & DEVELOPMENT CORPORATION, Corning, NY (US)

(72) Inventors: Michael De Jong, Colleyville, TX (US); Andreas Matiss, Berlin (DE); Carmi Shapira, D.N. Modiin (IL); Eric Stephan ten Have, Berlin (DE)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 625 days.

(21) Appl. No.: 18/102,330

(22) Filed: Jan. 27, 2023

(65) Prior Publication Data

US 2023/0171526 A1    Jun. 1, 2023

Related U.S. Application Data

(63) Continuation of application No. PCT/US2021/041985, filed on Jul. 16, 2021.

(Continued)

(51) Int. Cl.
  *G02B 6/44* (2006.01)
  *H04Q 11/00* (2006.01)
(52) U.S. Cl.
  CPC ....... *G02B 6/4472* (2013.01); *H04Q 11/0005* (2013.01)
(58) Field of Classification Search
  CPC  H04Q 11/0005; G02B 6/4472; G02B 6/7752; G02B 6/29385
  See application file for complete search history.

(56) References Cited

U.S. PATENT DOCUMENTS 12,392,979 B2 *  8/2025  Rosenfelder ......... G02B 6/4472
12,463,740 B1 *  11/2025  Jia ........................ H01S 5/4006
            (Continued)

FOREIGN PATENT DOCUMENTS

CN    101111790 A  *  1/2008  ......... G02B 6/44515
CN    110998395 A  *  4/2020  .......... G02B 6/3879
            (Continued)

OTHER PUBLICATIONS

CN_101111790_A (English translation) (Year: 2008).*
            (Continued)

Primary Examiner — Thomas A Hollweg
Assistant Examiner — Mary A El-Shammaa
(74) Attorney, Agent, or Firm — Michael E. Carroll, Jr.

(57) ABSTRACT

Field-configurable optical devices and methods are disclosed. In one example, a field-configurable optical device includes a housing defining an enclosure, a splitter disposed within the enclosure and having one or more splitter inputs and a plurality of splitter outputs, and a plurality of couplers within the enclosure. The field-configurable optical device includes a plurality of sets of split-ratio selection ports located at an exterior of the housing. The plurality of sets of split-ratio selection ports and the plurality of couplers are configured such that the power split ratio of the field-configurable optical device is established by connecting an input optical fiber to the coupler input port of a selected set of split-ratio selection ports, and connecting a pass-through optical fiber to the coupler pass-through port of the selected set of split-ratio selection ports.

41 Claims, 15 Drawing Sheets

Related U.S. Application Data

(60) Provisional application No. 63/059,295, filed on Jul. 31, 2020.

(56) References Cited

U.S. PATENT DOCUMENTS

| | | | | |
|---|---|---|---|---|
| 2008/0175548 | A1* | 7/2008 | Knecht | G02B 6/4475 |
| | | | | 385/100 |
| 2009/0208177 | A1* | 8/2009 | Smith | H04B 10/271 |
| | | | | 385/135 |
| 2014/0282783 | A1* | 9/2014 | Totten | H04N 21/61 |
| | | | | 725/111 |
| 2015/0125152 | A1 | 5/2015 | Ji et al. | |
| 2015/0167888 | A1* | 6/2015 | Kanstad | E21B 36/003 |
| | | | | 165/96 |
| 2017/0195756 | A1* | 7/2017 | Schemmann | H04Q 11/0005 |
| 2017/0212321 | A1* | 7/2017 | Gronvall | G02B 6/3874 |
| 2018/0084320 | A1* | 3/2018 | Martinho | H04J 14/02126 |
| 2019/0353865 | A1* | 11/2019 | Marcouiller | G02B 6/4472 |
| 2020/0196035 | A1* | 6/2020 | Rousseaux | G02B 6/3596 |
| 2023/0288646 | A1* | 9/2023 | De Jong | G02B 6/3827 |
| 2024/0402453 | A1* | 12/2024 | Gildehaus | G02B 6/4471 |
| 2025/0256349 | A1* | 8/2025 | Li | B23K 26/0626 |

FOREIGN PATENT DOCUMENTS

| | | | | | |
|---|---|---|---|---|---|
| EP | 2259116 | A2 * | 12/2010 | | G02B 6/4472 |
| KR | 20070085684 | A * | 8/2007 | | G02B 6/4472 |
| RU | 197413 | U1 * | 4/2020 | | G02B 6/4442 |
| WO | WO-2014123940 | A1 * | 8/2014 | | G02B 6/4439 |
| WO | WO-2016137934 | A1 * | 9/2016 | | G02B 6/40 |
| WO | WO-2017205059 | A1 * | 11/2017 | | G02B 6/4472 |
| WO | WO-2018222740 | A1 * | 12/2018 | | H04Q 11/0005 |
| WO | WO-2019143510 | A1 * | 7/2019 | | G02B 6/44515 |
| WO | WO-2020002127 | A1 * | 1/2020 | | H04B 7/0456 |
| WO | WO-2022093659 | A1 * | 5/2022 | | G02B 6/44715 |

OTHER PUBLICATIONS

CN_110998395_A (English translation) (Year: 2020).*
KR_20070085684_A (English translation) (Year: 2007).*
RU_197413_U1 (English translation) (Year: 2020).*

* cited by examiner

149

130

132,134

OPTICAL DEVICES HAVING EXTERNALLY FIELD-CONFIGURABLE SPLITTING RATIOS AND METHODS OF USING THE SAME

CROSS REFERENCE TO RELATED APPLICATIONS

This application is a continuation of International Patent Application Serial No. PCT/US2021/041985 filed on Jul. 16, 2021, designating the United States of America, and U.S. Provisional Application Ser. No. 63/059,295 filed on Jul. 31, 2020, the contents of which are relied upon and incorporated herein by reference in their entirety.

BACKGROUND

The present disclosure is directed to optical devices of an optical communication network and, more particularly, optical devices having a field-configurable splitting ratio and methods of using the same.

Optical fiber is increasingly being used for a variety of applications, including, but not limited to, broadband voice, video, and data transmission. As bandwidth demands increase, optical fiber is migrating toward subscribers in outdoor communication networks such as in fiber to the premises applications such as FTTx and the like.

Optical communication networks commonly employ a daisy-chain architecture, where an optical signal is sequentially tapped-off at access points along a distribution cable. At each access point, the optical signal is split such that a percentage of the optical signal is split amongst subscribers and another percentage is provided further downstream to the next access point. Couplers having different splitting ratios are used to split the optical signal. For example, couplers in a daisy-chain may have 90%/10% (i.e., 10% of the signal provided to a plurality of subscribers and 90% provided to the next coupler) 80%/20%, 70%/30%, and 60%/40% splitting ratios. Each one of these couplers requires different components to provide the desired splitting ratio. Thus, in this example, six individual parts need to be manufactured, inventoried, stored, and transported by the installation team. Many different stock keeping units (SKU) add cost and complexity to building optical communication networks.

SUMMARY

The present disclosure is directed to optical devices, such as multiport devices or cabinets, having a splitting ratio that is configurable in the field. Therefore, rather than having multiple individual parts to manufacture, inventory and store, only one part number is needed. The craft may take one optical device and add it to any point in the optical network, which adds significant flexibility. The reduced number of SKUs further reduces the cost to build optical communication networks.

One aspect of the disclosure is directed to a field-configurable optical device including a housing defining an enclosure, a splitter disposed within the enclosure and having one or more splitter inputs and a plurality of splitter outputs, and a plurality of couplers within the enclosure. Each coupler has an input, a first output, and a second output. Each coupler has a power split ratio between the first output and the second output that is different from other couplers of the plurality of couplers. The second output of at least one coupler of the plurality of couplers is in optical communication with at least one splitter input of the one or more splitter inputs. The field-configurable optical device also includes a plurality of sets of split-ratio selection ports located at an exterior surface of the housing. Each set of split-ratio selection ports has a coupler input port and a coupler pass-through port. The coupler input port is in optical communication with the input of an individual coupler, and the coupler pass-through port is in optical communication with the first output of the individual coupler. The field-configurable optical device further includes a plurality of output ports located at the housing, wherein the plurality of output ports are in optical communication with the plurality of splitter outputs of the splitter. The plurality of sets of split-ratio selection ports and the plurality of couplers are configured such that the power split ratio of the field-configurable optical device is established by connecting an input optical fiber to the coupler input port of a selected set of split-ratio selection ports of the plurality of sets of split-ratio selection ports, and connecting a pass-through optical fiber to the coupler pass-through port of the selected set of split-ratio selection ports of the plurality of sets of split-ratio selection ports.

Another aspect of the disclosure is directed to a system for an optical communications network including a cable assembly having a pass-through optical fiber, an input optical fiber, and a multi-fiber connector terminating the pass-through optical fiber and the input optical fiber, and an optical device. The optical device includes a housing defining an enclosure, a splitter disposed within the enclosure and having one or more splitter inputs and a plurality of splitter outputs, and a plurality of couplers within the enclosure. Each coupler has an input, a first output, and a second output. Additionally, each coupler has a power split ratio between the first output and the second output that is different from other couplers of the plurality of couplers. The second output of at least one coupler of the plurality of couplers is in optical communication with at least one splitter input of the one or more splitter inputs. The optical device further includes a plurality of sets of split-ratio selection ports located at an exterior surface of the housing. Each set of split-ratio selection ports has a coupler input port and a coupler pass-through port. The coupler input port is in optical communication with the input of an individual coupler, and the coupler pass-through port is in optical communication with the first output of the individual coupler. The optical device further includes a plurality of output ports located at the housing, wherein the plurality of output ports are in optical communication with the plurality of splitter outputs of the splitter. The plurality of sets of split-ratio selection ports and the plurality of couplers are configured such that the power split ratio of the field-configurable optical device is established by connecting the multi-fiber connector of the cable assembly to the coupler input port and the coupler pass-through port of a selected set of split-ratio selection ports.

Another aspect of the disclosure is a method of configuring a field-configurable optical device. The method includes connecting an input connector of a cable assembly to a coupler input port of an individual set of splitting ratio selection ports among a plurality of sets of splitting ratio selection ports at an exterior surface of a housing of the field-configurable optical device, and connecting a pass-through connector of the cable assembly to a coupler pass-through port of the individual set of splitting ratio selection ports. The plurality of sets of splitting ratio selection ports is in optical communication with a plurality of couplers. Each coupler of the of the plurality of couplers has a power splitting ratio that is different from other couplers of the plurality of couplers such that selection of the individual set of splitting ratio selection port establishes a power splitting ratio of the optical device. Moving the input connector and the pass-through connector from a set of splitting ratio selection port to a second set of splitting ratio selection ports changes the power splitting ratio of the field-configurable optical device.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

4

Figure 8:
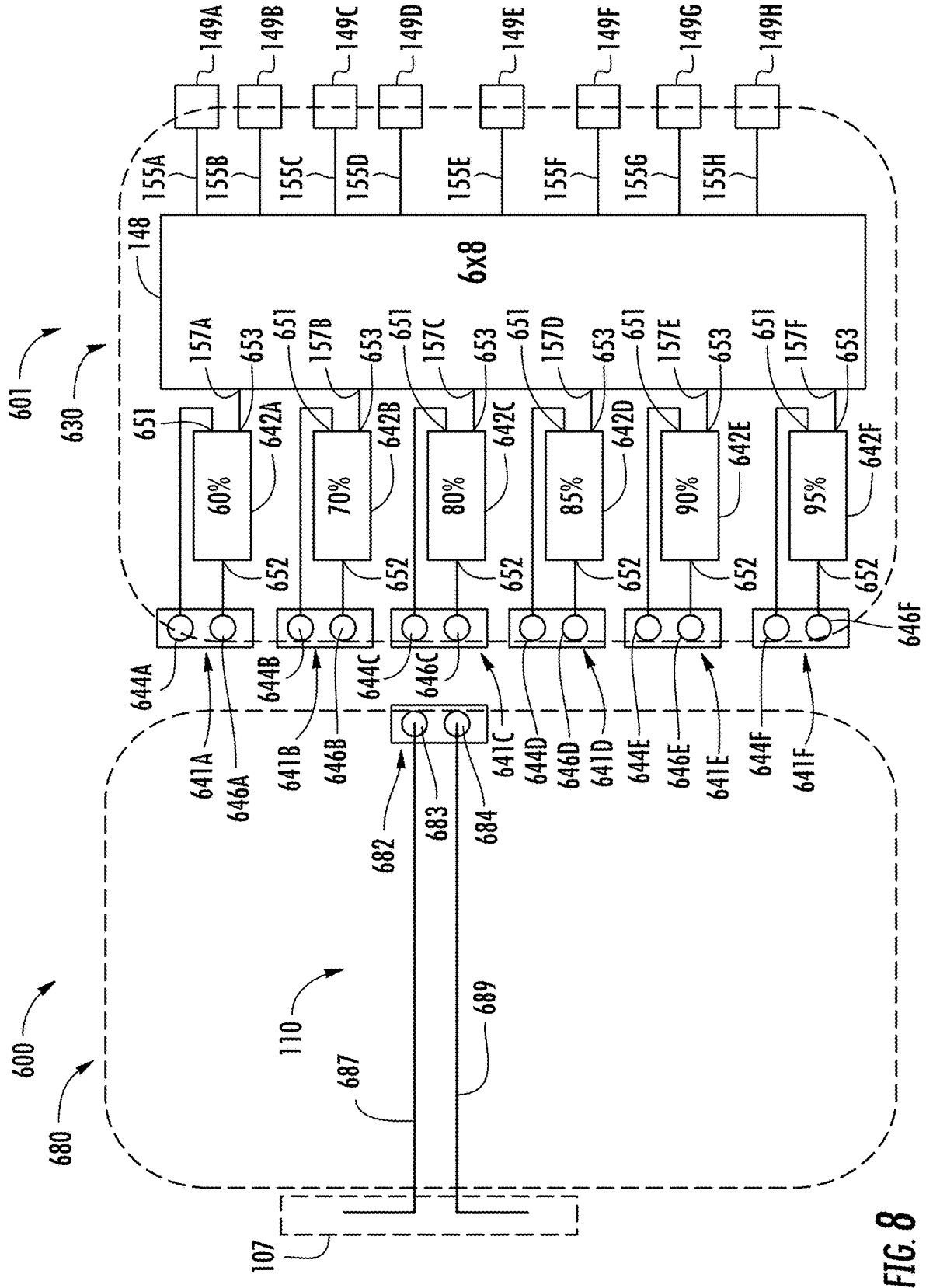
FIG. 8 illustrates an example optical device having a selected splitting ratio that is selected at an exterior of the optical device and uses an N×M splitter according to one or more embodiments disclosed and illustrated herein.
Figure 9:
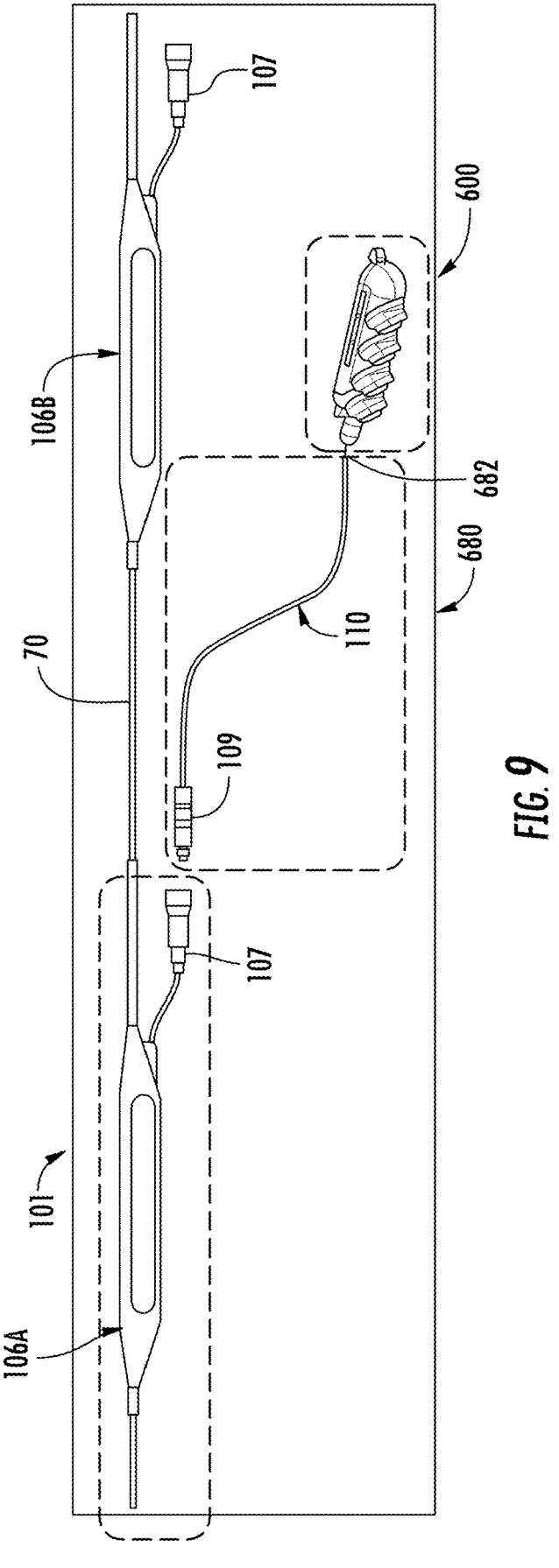
Figure 10:
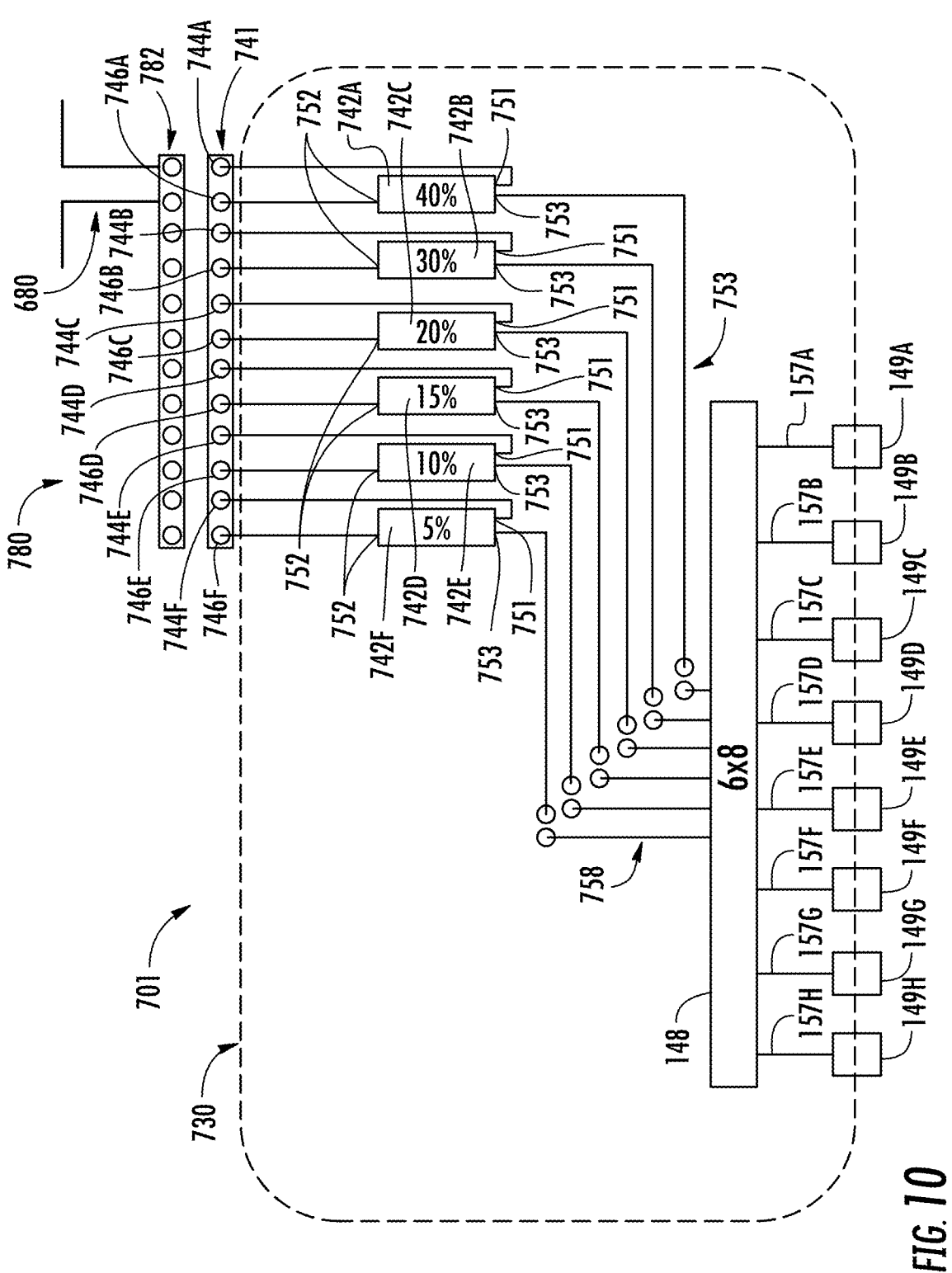
Figure 11:
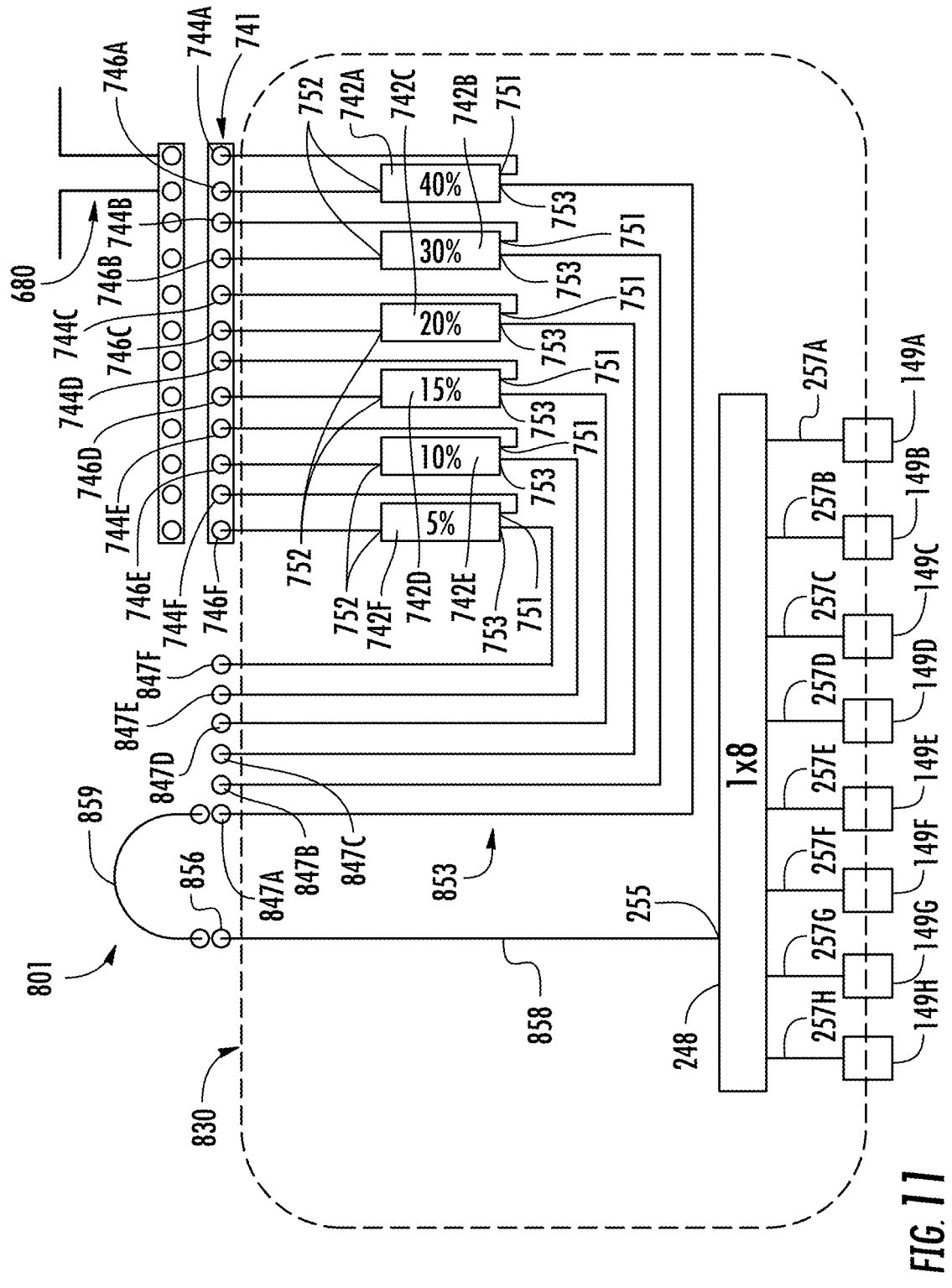
Figure 12:
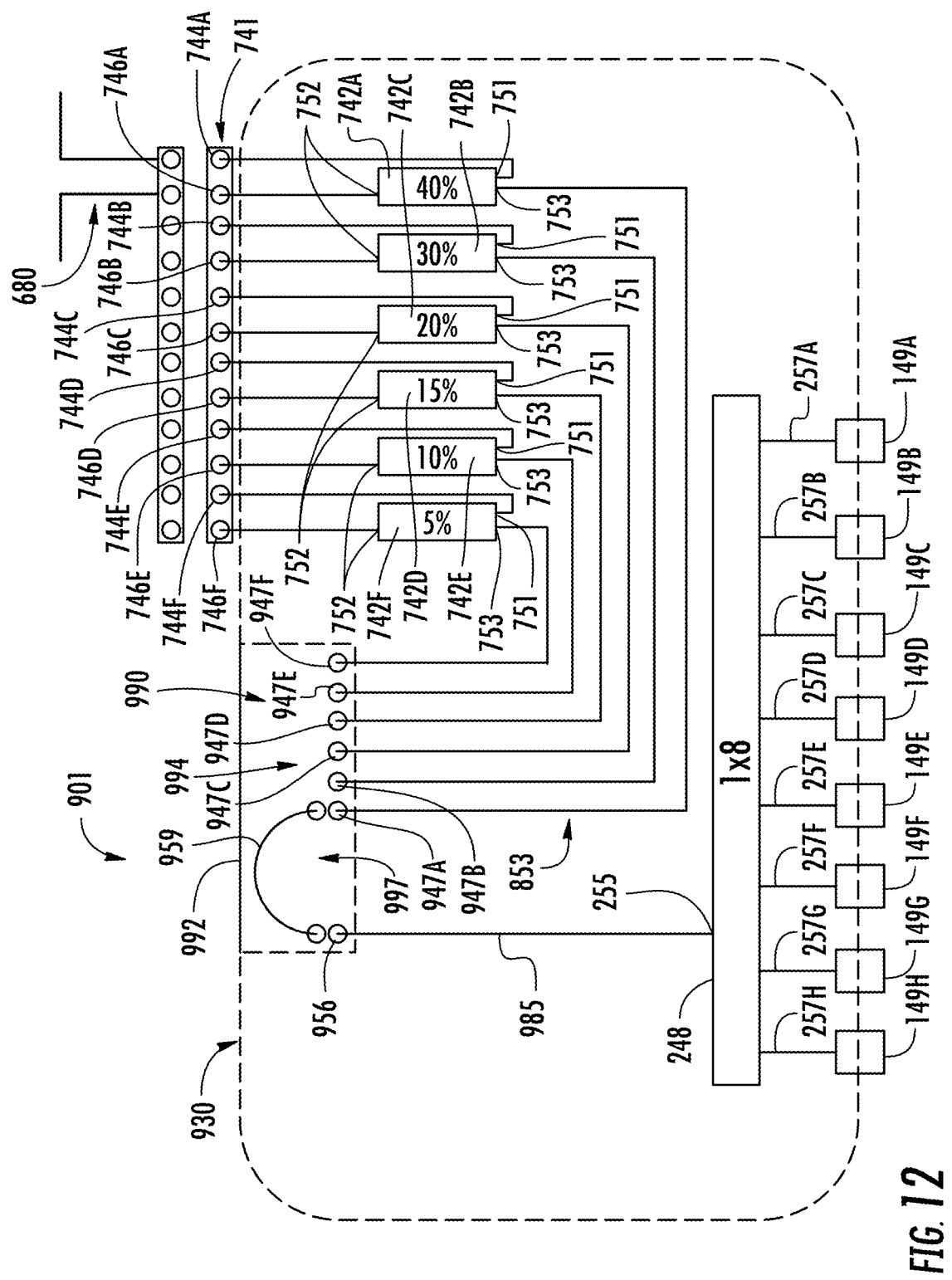
Figure 13:
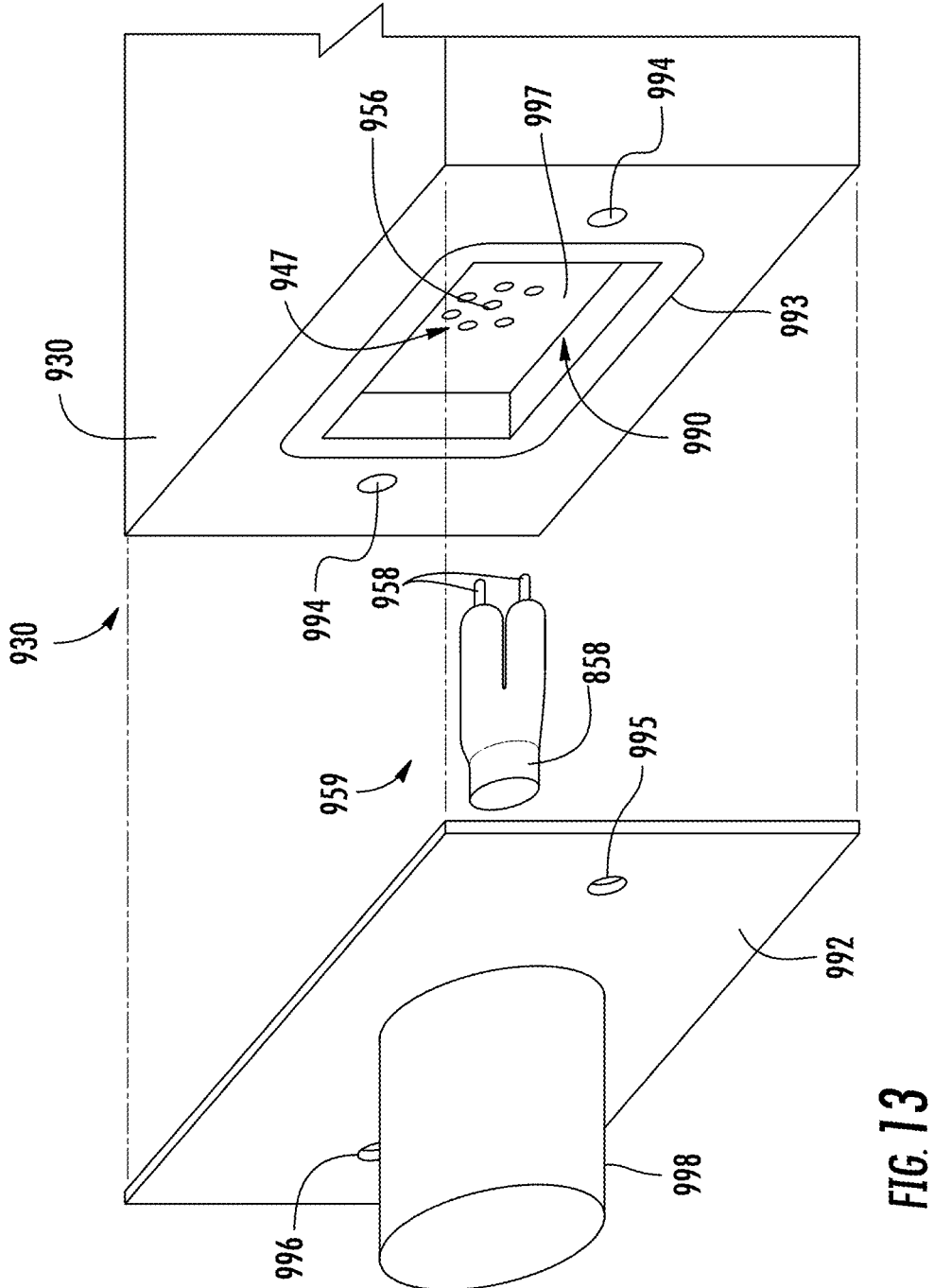
Figure 14:
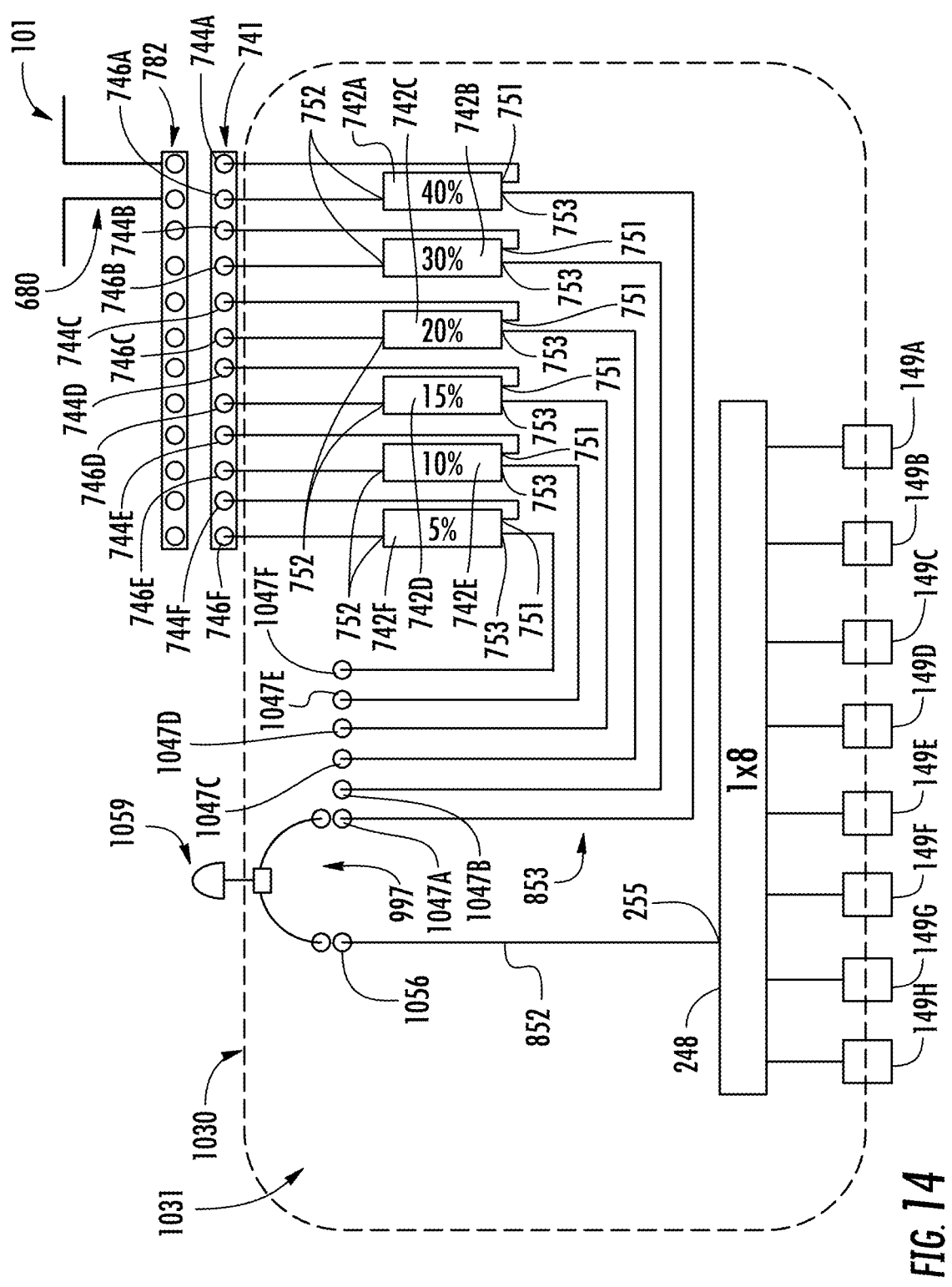

FIG. 9 illustrates a close-up view of an example optical communication network using an optical device of FIG. 8 according to one or more embodiments disclosed and illustrated herein;

FIG. 10 illustrates an example optical device having a selected splitting ratio that is selected at an exterior of the optical device and uses a N×M splitter according to one or more embodiments disclosed and illustrated herein;

FIG. 11 illustrates another example optical device having a selected splitting ratio that is selected at an exterior of the optical device and uses an 1×M splitter according to one or more embodiments disclosed and illustrated herein;

FIG. 12 illustrates another example optical device having a selected splitting ratio that is selected at an exterior of the optical device and within a covered recess, and uses a 1×M splitter according to one or more embodiments disclosed and illustrated herein;

FIG. 13 illustrates a perspective view of an example optical device as illustrated by FIG. 12 according to one or more embodiments disclosed and illustrated herein; and FIG. 14 illustrates another example optical device having a selected splitting ratio that is selected at an exterior of the optical device using an actuator, and uses a 1×M splitter according to one or more embodiments disclosed and illustrated herein.

DETAILED DESCRIPTION

Reference will now be made in detail to the embodiments of the disclosure, examples of which are illustrated in the accompanying drawings. Whenever possible, like reference numbers will be used to refer to like components or parts.

Embodiments of the present disclosure are directed to optical devices, such as multiport devices, that are field-configurable such that a power splitting ratio may be established in the field, rather than at the factory. As described in detail below, embodiments reduce the number of unique part numbers that the manufacture of the optical device needs to manufacture, which reduces manufacturing and inventory costs, among other benefits. It should be understood that, although the optical devices are described herein in the context of multiport devices, embodiments may be configured as other optical devices that employ optical splitters. Thus, embodiments are not limited to multiport devices.

Optical communication networks rely on optical fiber cables to communicate data by way of optical signals. Fiber cable installation in sparsely populated rural areas is an especially expensive undertaking. Long lengths of fiber optic cable serve a small population. The cable material and installation costs are divided by a low population of end-users.

Therefore, an architecture which maximizes the number of users served by each fiber strand in the distribution cable may be attractive. Obviously, the more users that can be served by each fiber strand, allows the material and installation costs to be divided among that many more users.

Figures 1, 2:
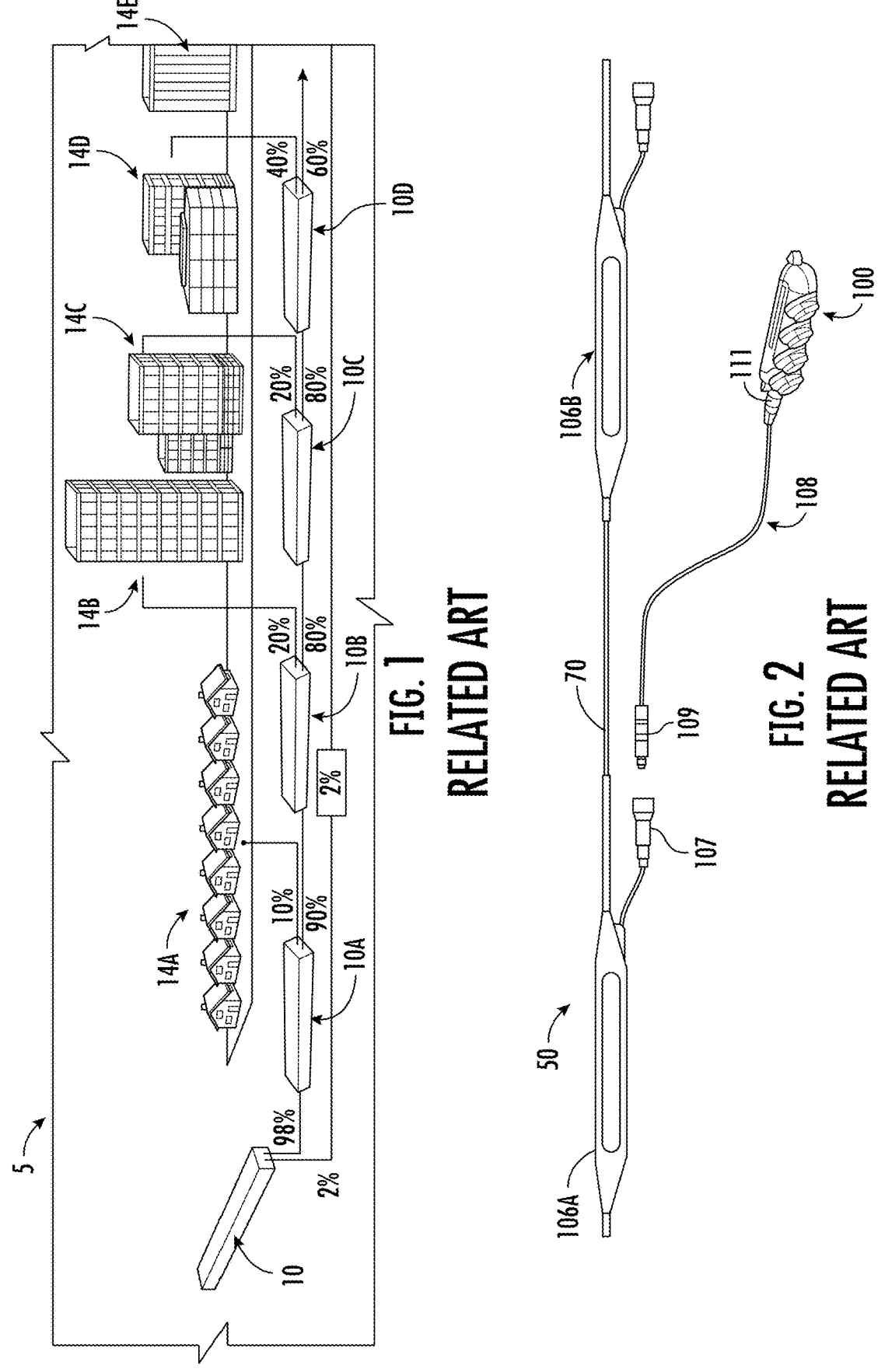
FIG. 1 illustrates an example optical communication network.
FIG. 2 illustrates a partial view of an example optical communication network according to one or more embodiments disclosed and illustrated herein.

A daisy-chained tap fiber to the x (FTTx) in the optical communication network 5 as shown in FIG. 1 is a common solution for optical communication network installation, such as those in rural areas. An optical line termination launches a high-power optical signal into a single fiber strand of a multifiber distribution cable 7. In the illustrated example, a first 1×2 coupler 10 splits the high-power optical signal into a first optical signal that is 98% of the power of the high-power optical signal that is passed to a next coupler 10A, and a second optical signal that is 2% of the power of the high-power optical signal to be used for monitoring purposes by a monitoring system 14E.

A plurality of asymmetric 1×2 optical tap couplers 10A-10D (also known as tap splitters) are inserted along the length of a given fiber strand of the distribution cable to tap-off a portion of the optical power to feed sets of users 14A-14D along the length of the distribution cable. It is noted that FIG. 1 only illustrates how the daisy chain distributes power to the various sets of users 14A-14D over a single fiber strand. However, the distribution cable (which is not shown in the figure) generally contains multiple fiber strands.

Generally, the power tapped off at each tap point is less than 50% and the power that continues downstream on the distribution cable is greater than 50%. Due to the uneven distribution of power between the two coupler output ports, the couplers are referred to as "asymmetric couplers" or "unbalanced couplers." However, it should be understood that a 50%/50% 1×2 coupler may be used.

Note that the distribution of the optical power between the two output ports of the couplers 10A-10D is most unbalanced at the first drop point and gradually approaches a more balanced distribution at the last tap coupler in the chain. This is because the minimum power required by each of the sets of users 14A-14D along the chain is identical, however the total optical power available in the chain is gradually being siphoned off at each subsequent coupler/tap point as the daisy-chain progresses downstream. As a result, each subsequent coupler/tap point in the daisy-chain needs to tap-off a larger percentage of the total power in order to keep the power to the end nodes constant.

The tapped optical signal exiting the coupler is then split again to be evenly provided to individual users. For example, the 10% optical signal is split again and provided to individual users. The couplers 10A-10D may be provided in a multiport device that includes not only a 1×2 coupler, but also an N×M splitter. For example, an eight output multiport device may utilize a 1×8 splitter to split the 10% optical signal eight ways. Fiber optic cable assemblies are connected to the output ports of the multiport device and delivered to individual users.

Each coupler has a tolerance on maximum loss due to changes in loss over the range of optical wavelengths used in the system, aging, manufacturing tolerances and environmental factors such as temperature. The splitting ratio and/or optical loss may vary as a result of any of these factors. An optical budget is calculated for each end node considering the worst-case loss for each coupler. Being that the total optical budget available is a given, any additional dB that needs to be subtracted from the total budget due to large tolerances of the components will result in compromises on the allowable number of drop points along the daisy chain.

For example, using very tightly tolerance components which maintain an almost constant loss (even over wavelength and environmental conditions) may afford up to six drop points. At the other extreme, components with losses that vary greatly over temperature and wavelength may only allow three drop points along the chain. Thus, couplers which can maintain a constant and predictable low loss over temperature, wavelength and environmental stresses are best positioned to deliver the most drop points along the daisy chain.

Therefore, there is value in using optical coupler components which have tighter tolerances to maximize the number of attainable drop points for a given optical budget. This tradeoff between number of attainable drop points and tolerances of components should ideally be optimized to attain the best combination.

Still referring to FIG. 1, couplers 10, 10A-10D each have a different power splitting ratio. Thus, internal components of the couplers 10, 10A-10D are different and therefore require the manufacture to produce and inventory many unique part numbers, which adds cost. For example, if six different asymmetric coupler splitter ratio values are employed over the length of a distribution cable in a daisy-chain, then six unique stock keeping units (SKU) must be created, inventoried, and carried by the craft during installation or maintenance.

Embodiments of the present disclosure provide a field-configurable optical device that contains all of the 1×2 couplers corresponding to a plurality of selectable splitting ratios. Thus, only one SKU is provided for a device covering a plurality of selectable splitting ratios. In some embodiments, the optical device is environmentally sealed at the factory and field-configuration is performed at the exterior of the optical device. In other embodiments, the housing of the optical device is configured to be opened such that field-configuration is performed within an enclosure of the optical device. The housing may then be closed and sealed again after field-configuration.

Embodiments reduce inventory and warehouse space because one part may reduce a plurality of parts (e.g., one multiport device may replace six in the daisy-chain). This is logistically much simpler than manufacturing and storing many different parts.

Embodiments also increase labor efficiency, reduce installation complexity, and enable faster subscriber turn-on using the same crew of craftsmen. An installation team only needs to carry one single SKU with them to the field for installation. This one SKU may be installed at any point along the distribution cable. The team is not required to work with discrete coupler components, and the optical devices disclosed herein do not require fiber splicing. All optical components are preassembled in a pigtailed module.

The flexibility of the optical devices disclosed herein enable them to be included in a "snap in" family of interchangeable optical modules that provide a platform that can be easily extended. For example, the optical device, such as a multiport device, may be added at any point within the optical network. One optical device may act as a host to a wide range of optical modules that can perform a multitude of functions to the optical signals running through the optical device for future systems.

Various embodiments of optical devices and methods are described in detail below.

Referring to FIG. 2, and example daisy-chain implementation of an optical communication network 50 is illustrated. The optical communication network 50 includes a distribution cable 70 and a plurality of pre-terminated access points 106A, 106B that are engineered into the distribution cable 70. Any number of access points may be provided (e.g., six access points). The access points 106A, 106B provide a break in an optical fiber within the distribution cable 70. An optical fiber within a connectorized tether assembly 107 is optically coupled to the broken optical fiber at the access point 106A, 106B. As used herein, the phrases "optically coupled" and "in optical communication with" mean that optical signals pass between two components.

An intermediate cable assembly 108 has a first connector 109 that connects to the tether assembly 107 and a second connector 111 that connects to an optical device 100, which in the illustrated embodiment is configured as a multiport device or cabinet. The intermediate cable assembly 108 comprises an input optical fiber and a pass-through optical fiber (not shown). An input optical signal is provided to the input optical fiber of the intermediate cable assembly 108 through the tether assembly 107. The pass-through optical fiber receives a pass-through optical signal (i.e., a tapped optical signal) from a selected coupler within the optical device, and provides the pass-through optical signal to the distribution cable 70 by way of the tether assembly 107. The pass-through optical signal is then propagated downstream to the next access point over the distribution cable 70. For example, a pass-through signal generated by the optical device 100 after a first access point 106A is provided as an input to an optical device of a second access point 106B (see FIG. 1).

Figure 3A:
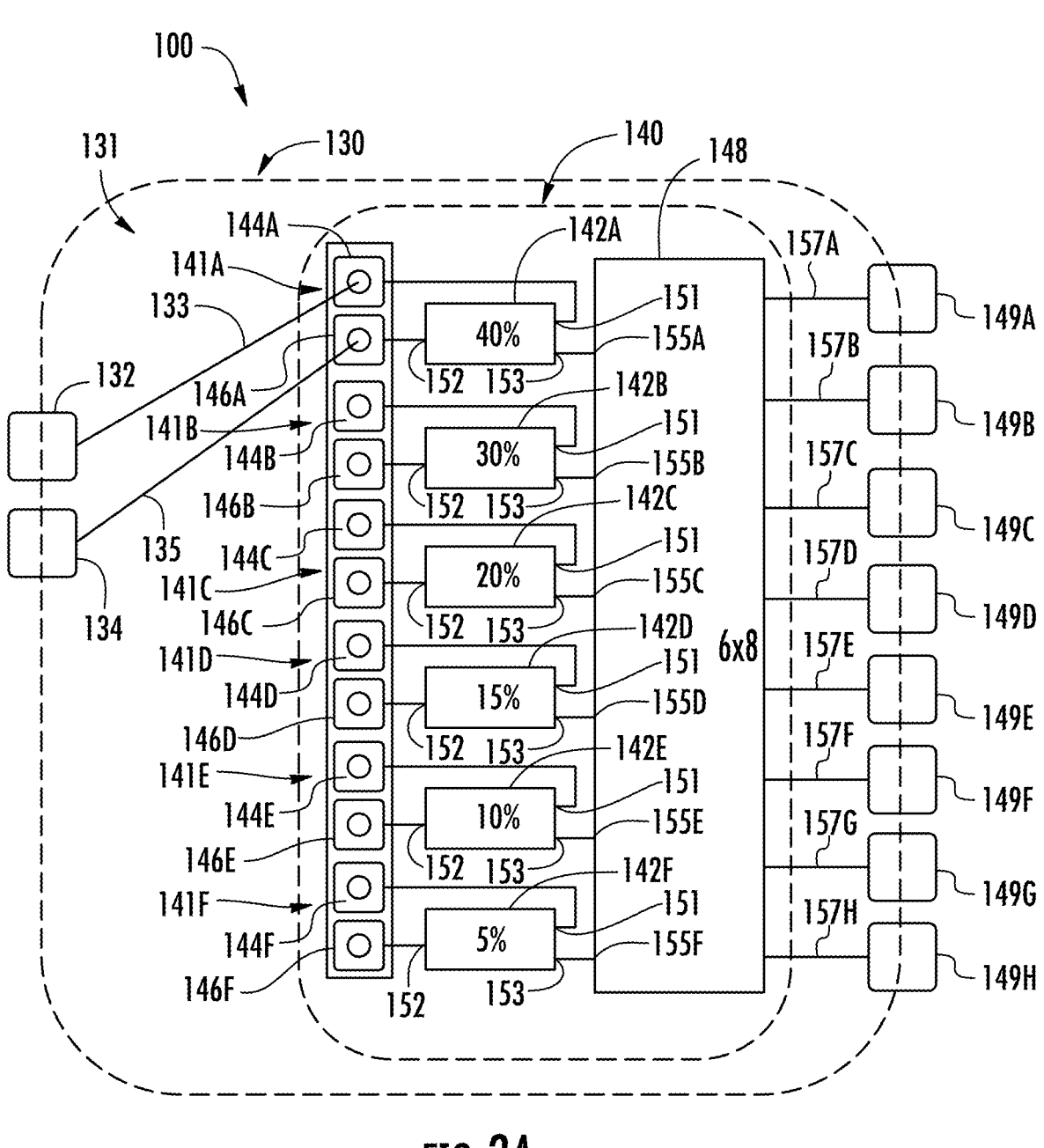
FIG. 3A illustrates an example optical device having a selected splitting ratio that is selected within an enclosure of the optical device and uses an N×M splitter according to one or more embodiments disclosed and illustrated herein.

Referring now to FIG. 3A, an example optical device configured as a field-configurable multiport device 100 is schematically illustrated as a block diagram. "Field-config-urable" as used herein means that a craft or other user can select an intended splitting ratio of the multiport device in the field rather than just at the factory. As described in more detail below, the multiport device 100 is capable of being configured as having an intended splitting ratio among a plurality of splitting ratios. Non-limiting splitting ratios include 95%/5%, 90/10%, 85/15%, 80/20%, 70/30%, and 60%/40%.

The example multiport device 100 generally comprises a housing 130 defining an enclosure 131 and an optical module 140 disposed within the enclosure. The exterior of the housing 130 has several ports for mating with connectors to optically couple the multiport device 100 to various other components within the optical network. As used herein, the term "port" means a receptacle that receives a connector. It is noted that the term "adapter" may be used synonymously with the term "port" herein as is known in the art.

In the example of FIG. 3A, the multiport device 100 comprises an input port 134, a pass-through port 132, and a plurality of output ports 149A-149H. The input port 134 is configured to receive an input connector of a tether assembly 107 having an input fiber that is tapped from a distribution cable 70 as described above with respect to FIG. 2. The pass-through port 132 is configured to receive a pass-through connector of the tether assembly 107 having a pass-through fiber that receives a pass-through signal as an output from the multiport device 100 that is used to daisy-chain multiple multiport devices 100 together.

In some embodiments, the input port 134 and the pass-through port 132 are configured as a single multifiber port configured to receive a second connector 111, which may be a multifiber connector, such as an MPT connector, as shown in FIG. 2. In other embodiments, the input port 134 and the pass-through port 132 are separate ports configured to receive separate connectors.

Figure 3B:
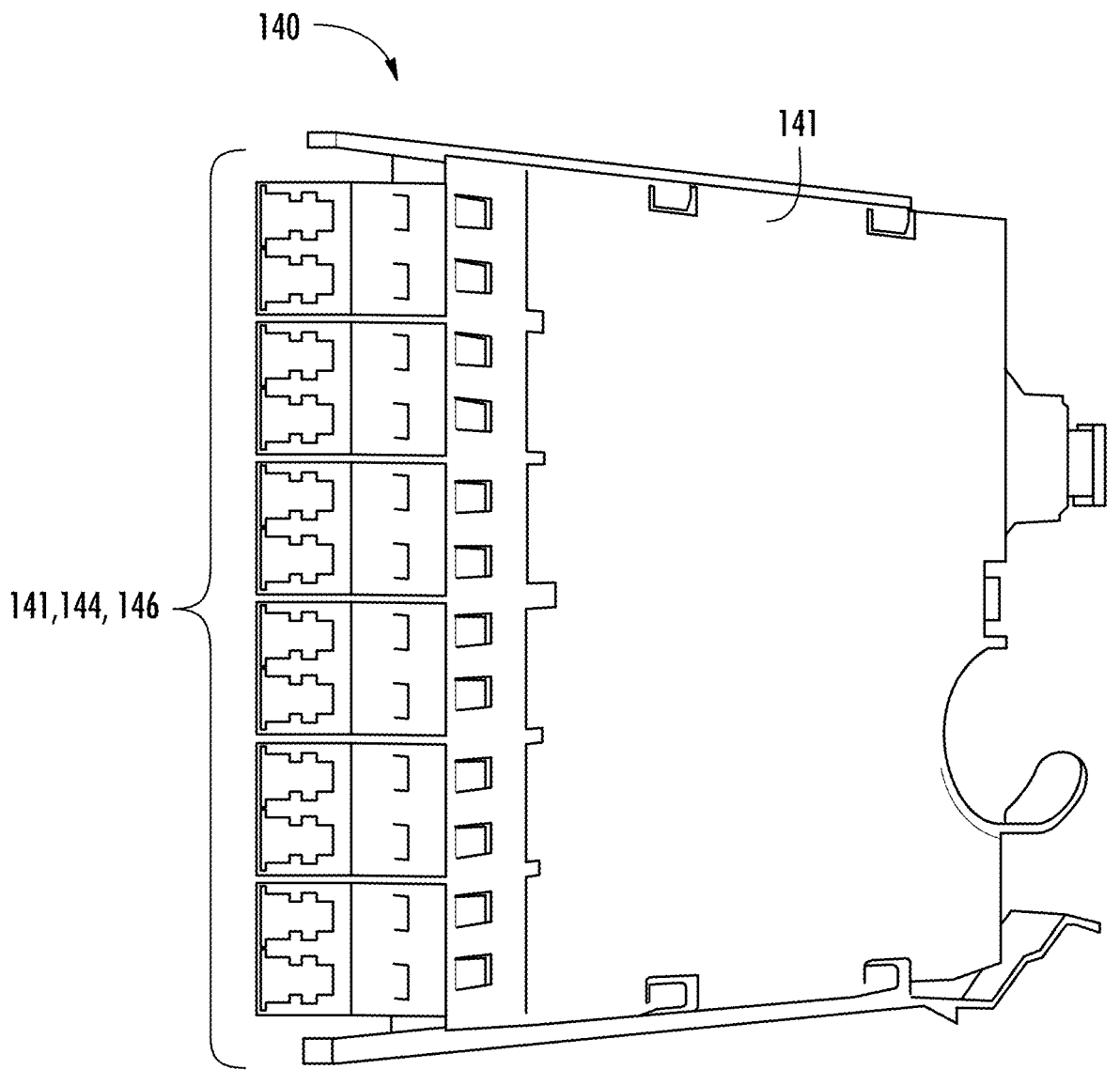
FIG. 3B illustrates an example optical module cassette comprising a plurality of couplers according to one or more embodiments disclosed and illustrated herein.
Figure 3C:
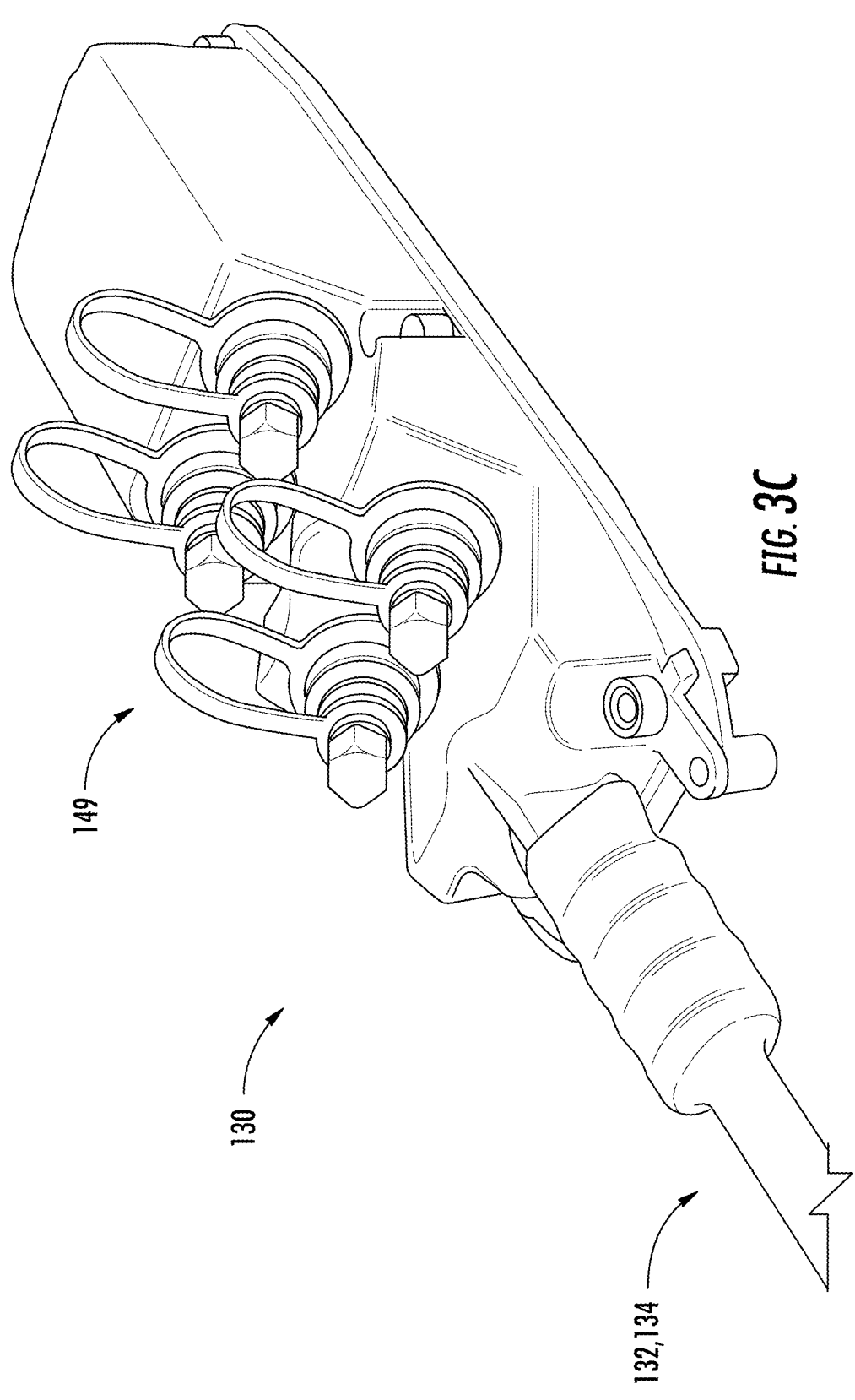
FIG. 3C illustrates an example housing of an optical device according to one or more embodiments disclosed and illustrated herein.

The output ports 149A-149H ports are located at an exterior wall of the housing 130 and are configured to receive connectors of cable assemblies (not shown) that route optical signals to users of the optical communication network. Embodiments are not limited by the style and configuration of the output ports 149A-149H. As a non-limiting example, the output ports 149A-149H may be configured as OptiTap® bulkhead adapters manufactured by Corning Optical Communications of Charlotte, N.C. FIG. 3C illustrates an example housing 130 of a multiport device 100 having four output ports 149 configured as OptiTap® bulkhead adapters. However, it should be understood that more or fewer than four output ports 149 may be provided, and that embodiments are not limited to the shape, size and configuration of the housing depicted by FIG. 3C. The housing 130 and style of the output ports 149 may take on any configuration.

Disposed within the enclosure 131 defined by the housing 130 is an optical module 140 configured to split the optical signal provided at the input port 134 into a first optical signal that is split into a plurality of output signals and a second optical signal that is passed to the next multiport (i.e., a pass-through optical signal). The optical module 140 is configured to selectively split the input optical signal into the first optical signal and the second optical signal in accordance with a select splitting ratio that is selected by the craft among a plurality of possible splitting ratios offered by the multiport device 100.

The optical module 140 includes a plurality of couplers 142A-142F, wherein each coupler has a different splitting ratio. In the embodiment of FIG. 3A, each coupler of the plurality of couplers 142A-142F is an asymmetric (also known as "unbalanced") because of the first optical signal and the second optical signal have different power levels. However, it should be understood that embodiments may also employ couplers having a 50-50 splitting ratio. In the illustrated embodiment a first coupler 142A has a 5%-95% splitting ratio, a second coupler 142B has a 10%-90% splitting ratio, a third coupler 142C has a 15%-85% splitting ratio, a fourth coupler 142D has a 20%-80% splitting ratio, a fifth coupler 142E has a 30%-70% splitting ratio, and a sixth coupler 142F has a 40%-60% splitting ratio. It should be understood that embodiments are not limited to any particular splitting ratio.

Each coupler of the plurality of couplers 142A-142F includes an input 152, a first output 151 that outputs the first output signal, and a second output 153 that outputs the second output signal.

A plurality of sets of splitting ratio selection ports 141A-141F that enable the craft to select the desired splitting ratio of the multiport device 100 is disposed within the enclosure 131. The plurality of sets of splitting ratio selection ports 141A-141F comprise a plurality of coupler input ports 146A-146F for receiving an input port fiber optic jumper assembly 135 and a plurality of coupler pass-through ports 144A-144F for receiving a pass-through port fiber optic jumper assembly 133.

The sets of splitting ratio selection ports 141A-141F may be configured as duplex adapters, such as, without limita-tion, duplex LC adapters for receiving duplex LC connec-tors. FIG. 3B illustrates an example optical module 140 configured as a cassette with a housing, and pairs of LC adapters as the sets of splitting ratio selection ports 141. In some embodiments, the two-fiber duplex adapters are keyed to allow the connection of duplex connectors in only one polarity/orientation.

It should be understood that other configurations are also possible. For example, simplex ports may be utilized.

As shown by FIG. 3A, the input 152 of each coupler 142 is in optical communication with a coupler input port 146, the first output 151 of each coupler 142 is in optical communication with the coupler pass-through port 144, and the second output 153 is in optical communication with an input of a splitter 148. As used herein, the term "splitter" refers to a symmetric N×M splitter wherein N<M (e.g., a NM splitter) and the term "coupler" refers to an asymmetric 1×2 coupler or in some cases a symmetric 1×2 coupler.

As described in more detail below, the plurality of cou-plers 142A-142F and the splitter 148 may be provided by a single planar lightwave circuit (PLC) in a non-limiting embodiment. Thus, a single PLC chip may provide the splitting ratios of the plurality of couplers and the splitter. Further, the PLC chip may also include waveguides to optically couple the plurality of couplers 142A-142F to the splitter 148 and the plurality of sets of splitting ratio selection ports 141A-141F. For example one or more of the input 152, the first output 151 and the second output 153 may be provided by a waveguide on or within the PLC chip. One or more of the input 152, the first output 151 and the second output 153 may be provided by an optical fiber and connectors, for example. In an non-limiting example the second output 153 is provided by a waveguide of a PLC and the input 152 and the first output 151 are provided by optical fibers.

As a non-limiting example, the optical fibers providing the internal connections between the plurality of couplers 142A-142F and the connected components may be provided by pigtailed input and output ports. For example, the pigtailed input ports and pigtailed output ports may include LC input/output ports for receiving LC connectors. However, other connector and port styles may be utilized.

The splitter 148 has one or more splitter inputs 155A-155F and one or more splitter outputs 157A-157H. The splitter 148 is an N×M splitter having N inputs and N outputs where N is equal to or less than M. In the example of FIG. 3A, the splitter 148 has 6 inputs and 8 outputs. In other embodiments, the splitter may have, without limitation, 4 inputs and 8 outputs, 2 inputs and 8 outputs, or 1 input and 8 outputs. Any number of inputs or outputs may be provided. As stated above, the splitter may be provided by a PLC chip.

The splitter 148 and the plurality of couplers 142A-142F may split the optical signals by any known or yet-to-be-developed methods. Although the plurality of couplers 142A-142F are described above as being implemented by a PLC chip (i.e., PLC couplers), embodiments are not limited thereto. For example, the plurality of couplers 142A-142F and/or the splitter 148 may be thin-film couplers, fused biconic taper couplers, variable ratio couplers, and/or any known or yet-to-be-developed couplers. Further, it should also be understood that the splitter and/or the plurality of couplers 142A-142F may employ wavelength division multiplexing (WDM) or any other known or yet-to-be-developed method of splitting an optical signal.

The splitter outputs 157A-157H may be configured as connectorized pigtails having connectors (e.g., SC connectors) that are mated to the output ports 149A-149H (e.g., OptiTap® bulkhead adapters).

The multiport device 100 further includes an input port fiber optic jumper assembly 135 within the enclosure 131. The input port fiber optic jumper assembly 135 is in optical communication with the input port 134 of the housing 130. In a non-limiting example, the input port fiber optic jumper assembly 135 is configured as an optical fiber having a connector (not shown) at a first end that mates with the input port 134 (e.g., an OptiTap® bulkhead adapter) and a connector (not shown) on a second end that mates with a coupler input port of the plurality of coupler input ports 146A-146F. For example, the connector on the first end may be an SC connector and the connector on the second end may be an LC connector configured to be received by an LC coupler input port.

The multiport device 100 further includes a pass-through port fiber optic jumper assembly 133 within the enclosure 131. The pass-through port fiber optic jumper assembly 133 is in optical communication with the pass-through port 132 of the housing 130. In a non-limiting example, the a pass-through port fiber optic jumper assembly 133 is configured as an optical fiber having a connector (not shown) at a first end that mates with the pass-through port 132 (e.g., an OptiTap® bulkhead adapter) and a connector (not shown) on a second end that mates with a coupler input port of the plurality of coupler pass-through ports 144A-144F. For example, the connector on the first end may be an SC connector and the connector on the second end may be an LC connector configured to be received by an LC coupler pass-through port.

One or both ends of the pass-through port fiber optic jumper assembly 133 and the input port fiber optic jumper assembly 135 may have two simplex connectors or one duplex connector. In embodiments where duplex connectors are used, the pass-through port fiber optic jumper assembly 133 and the input port fiber optic jumper assembly 135 are provided in a single assembly. As a non-limiting example, the single assembly may be a duplex SC connector (at the first end for mating with the input port 134 and the pass-through port 132) to LC connector (at the second end for mating with the plurality of sets of splitting ratio selection ports 141A-141F) cable assembly.

To configure the multiport device 100 in the field, the craft opens the housing 130 to gain access to the enclosure 131. Each set of splitting ratio selection ports 141 has a particular power splitting ratio associated therewith. The optical module 140, such as the example optical module illustrated in FIG. 3B, may be labeled with indicia of the power splitting ratio for the plurality of sets of splitting ratio selection ports 141A-141F. The craft inserts the connector of the input port fiber optic jumper assembly 135 into the desired coupler input port 146 and the connector of the pass-through port fiber optic jumper assembly 133 into the desired coupler pass-through port 144.

In some embodiments, where duplex connectors and ports are utilized, the duplex sets of splitting ratio selection ports 141 are spaced to have a pitch that allows only one polarity of a duplex connector (e.g., an LC duplex connector). Thus, the pitch of the splitting ratio selection ports 141 and a keying feature provides that the craft can only connect the input port fiber optic jumper assembly 135 to the coupler input port 146 and the pass-through port fiber optic jumper assembly 133 to the coupler pass-through port 144. The pitch will not allow mating of one connector to one duplex splitting ratio port and the second connector to a neighboring duplex splitting ratio port.

In the illustrated embodiment, the craft desires the multiport device 100 to have a 40%-60% power splitting ratio and therefore has connected the input port fiber optic jumper assembly 135 to coupler input port 146A and the pass-through port fiber optic jumper assembly 133 to coupler pass-through port 144A. Thus, the optical signal at the input port 134 will propagate through the fiber of the input port fiber optic jumper assembly 135, enter first coupler 142A where 40% of its power is provided to input 155F of the splitter 148 and 60% of its power is provided to the pass-through port fiber optic jumper assembly 133 for transmission downstream. The 40% power optical signal that is provided to the splitter 148 is then split N ways (8 ways in the example of FIG. 3A) and provided to output ports 149A-149H. Only one coupler of the plurality of couplers 142A-142F is active and has light passing therethrough at a time. To change the power splitting ratio of the multiport device, the craft changes the set of splitting ratio ports that the input port fiber optic jumper assembly 135 and the pass-through port fiber optic jumper assembly 133 are connected to.

After connecting the input port fiber optic jumper assembly 135 and the pass-through port fiber optic jumper assembly 133, the craft then closes the housing 130 to seal the enclosure 131 from the environment.

Thus, the multiport device 100 of FIG. 3A enables selection from a plurality of power splitting ratios in one optical device, and therefore reduces the number of unique parts the manufacturer needs to produce and the number of parts the craft needs to carry during installation and maintenance. There is no splicing of optical fibers in the field, and there is a minimum number of connections and very little leeway for error. The connectors of the input port fiber optic jumper assembly 135 and the pass-through port fiber optic jumper assembly 133 may be color-coded with the plurality of sets of splitting ratio selection ports 141A-141F in the enclosure 131 so that all that is needed is to mate the connectors to the appropriate color-coded port.

Figure 4:
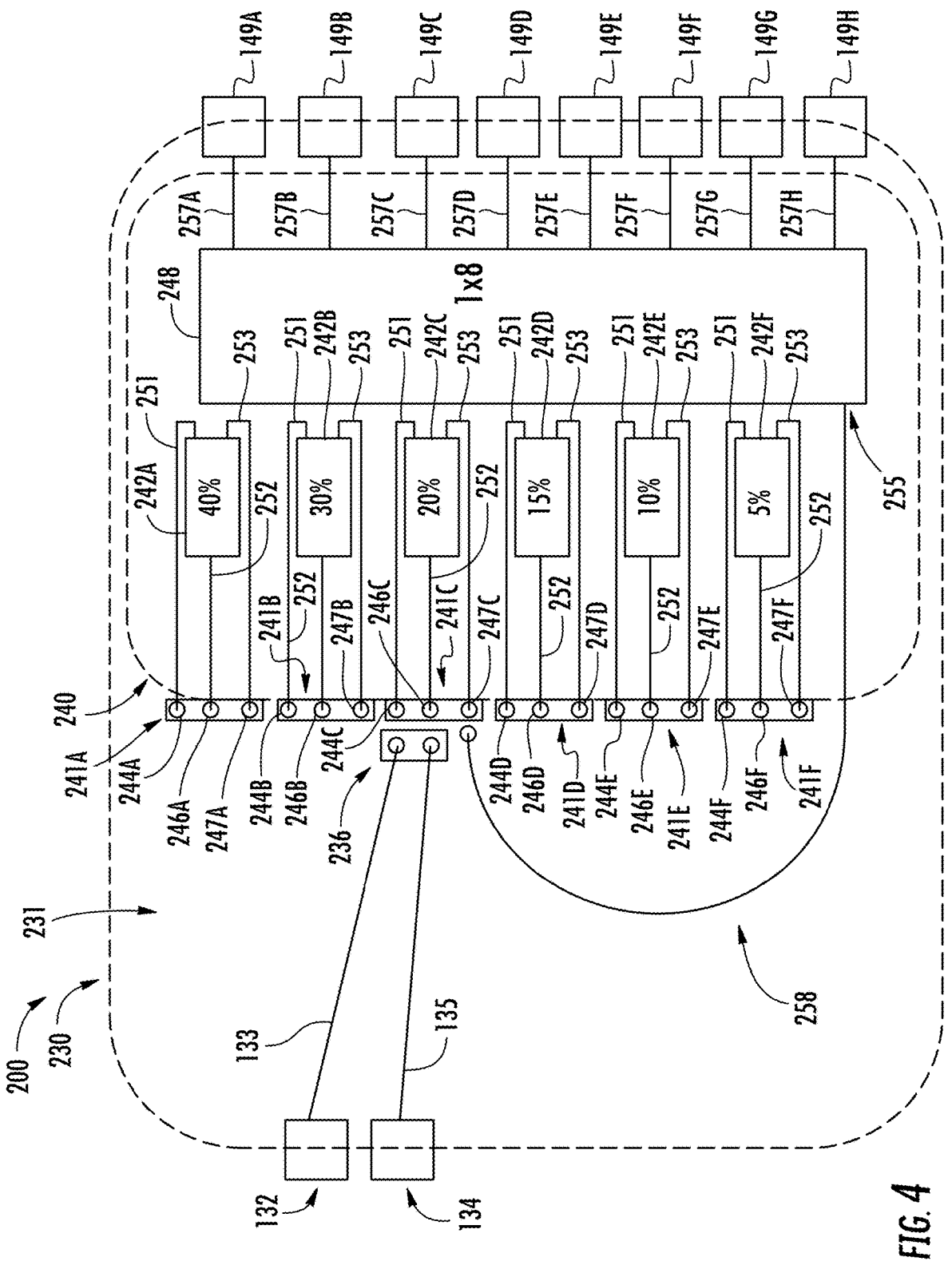
FIG. 4 illustrates an example optical device having a selected splitting ratio that is selected within an enclosure of the optical device and uses a 1×M splitter according to one or more embodiments disclosed and illustrated herein.

Referring now to FIG. 4, an optical device configured as a multiport device 200 having a single-input splitter 248 is illustrated. In the illustrated example, the splitter is a 1×8 splitter. However, it should be understood that more or fewer splitter outputs 257A-257H may be provided.

The advantage of using a 1×M splitter is greater flexibility and improved resourcing as 1×M splitters are widely available and at low cost. Additionally, the 1×2 couplers with different splitting ratios may all be realized in separate (sub)cassettes/housing to allow greater flexibility during manufacturing and/or modifications after the optical device has been deployed in the field. For example each 1×2 coupler may be provided in its own housing so that the optical module (e.g., a multiport device 200) may be customizable at the factory and/or in the field by inserting 1×2 couplers having the desired splitting ratios.

The example multiport device 200 comprises a plurality of couplers 242A-242F having different splitting ratios. Each coupler 242 has an input 252, a first output 251 that outputs a first output signal, and a second output 253 that outputs a second output signal.

The example multiport device 200 also includes a plurality of sets of splitting ratio selection ports 241A-241F that enable the craft to select the desired splitting ratio of the multiport device 200. The plurality of sets of splitting ratio selection ports 141A-141F comprise a plurality of coupler input ports 246A-246F for receiving an input port fiber optic jumper assembly 135, a plurality of coupler pass-through ports 244A-244F for receiving a pass-through port fiber optic jumper assembly 133, and a plurality of coupler splitter input ports 247A-247F for receiving a splitter input optical fiber jumper assembly 258 described in more detail below.

The sets of splitting ratio selection ports 141A-141F may be configured as duplex adapters, such as, without limitation, duplex LC adapters for receiving duplex LC connectors 236. Alternatively, the sets of splitting ratio selection ports 141A-141F may be configured as simplex adapters, or as triplex adapters.

The input 252 of each coupler 242 is in optical communication with a coupler input port 246, the first output 251 of each coupler 242 is in optical communication with the coupler pass-through port 244, and the second output 253 is in optical communication with the input 255 of the splitter 148.

Unlike the multiport device 100 of FIG. 3A, the example multiport device 200 further includes a splitter input optical fiber jumper assembly 258 that is used to connect the second output 253 of a selected coupler 242 to the single input 255 of the splitter 248. A first end of the splitter input optical fiber jumper assembly 258 is optically coupled to the splitter input 255 of the splitter 248 (e.g., by a connector). The second end of the splitter input optical fiber jumper assembly 258 is connectorized to be mated with a selected coupler splitter input port 247. In some embodiments, the second end of the splitter input optical fiber jumper assembly 258 has a simplex connector (e.g., a simplex LC connector). However, the connector at the second end of the splitter input optical fiber jumper assembly 258 may be provided in a triplex connector configured to mate with a set of splitting ratio ports configured as a triplex port (see FIG. 6, described below).

To configure the multiport device 200 for a desired power splitting ratio, the craft opens the housing 230 to access the enclosure 231. The craft then connects the input port fiber optic jumper assembly 135 to the coupler input port 246 and the pass-through port fiber optic jumper assembly 133 to the coupler pass-through port 244 of the desired set of splitting ratio selection ports 241. In the illustrated example, the input port fiber optic jumper assembly 135 and the pass-through port fiber optic jumper assembly 133 are terminated at a common duplex connector 236 (e.g., an LC duplex connector). However, it should be understood that simplex or triplex connectors may be utilized. The craft in the example of FIG. 4 has selected coupler 242C for a power splitting ratio of 20%/80%. To complete the configuration, the craft also connects the connector of the second end of the splitter input optical fiber jumper assembly 258 to coupler splitter input port 247C. In the example of FIG. 4, each set of splitting ratio selection ports is configured as a triplex port configured to mate with duplex connector 236 of the input port fiber optic jumper assembly 135 and the pass-through port fiber optic jumper assembly 133 and a simplex connector of the splitter input optical fiber jumper assembly 258.

The optical signal from the input port 134 will propagate through the input port fiber optic jumper assembly 135 and into coupler 242C where it will be split into a first optical signal having 80% power through the first output 251 and a second optical signal having 20% optical power through the second output 253. The second optical signal propagates through the splitter input optical fiber jumper assembly 258 and into the splitter 248 where it is split into eight optical signals provided at output ports 149A-149H.

An advantage of using a 1×M splitter is that it enables an "end-of-line" configuration wherein the plurality of couplers are bypassed altogether and the input port is directly coupled to the input of the splitter. When a multiport device acts as an end-of-line device, the pass-through port is not utilized as the end-of-line multiport device is the last device in the daisy-chained sub-network.

Figure 5:
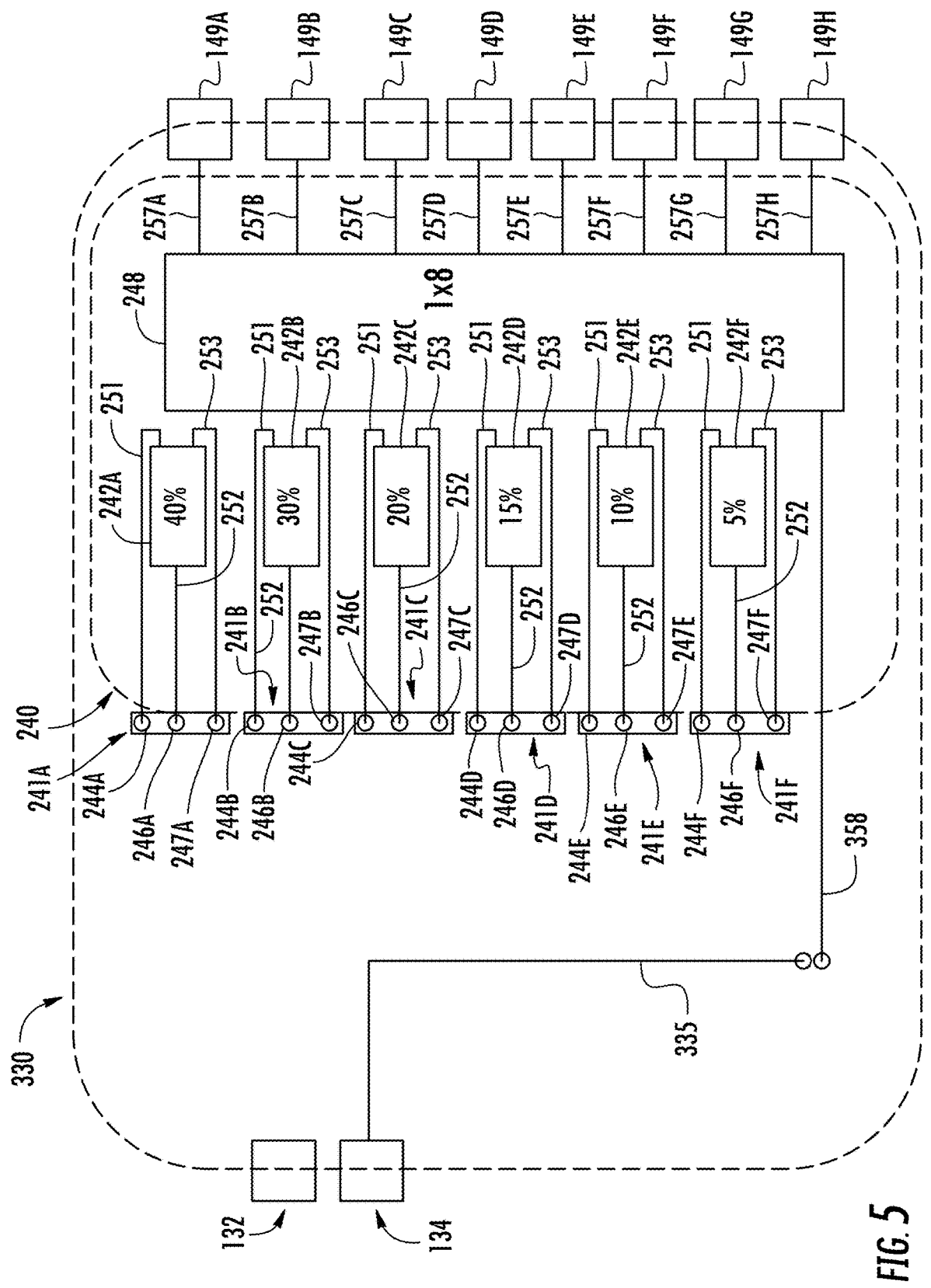
FIG. 5 illustrates an example optical device in an "end-of-line" configuration having a selected splitting ratio that is selected within an enclosure of the optical device and uses a 1×M splitter according to one or more embodiments disclosed and illustrated herein.

FIG. 5 illustrates an example multiport device 300 similar to the multiport device 200 however the multiport device 300 of FIG. 5 is configured as an end-of-line multiport device. A splitter input 255 is in direct optical communication with the input port 134 in this example configuration. In the illustrated embodiment, an input port fiber optic jumper assembly 335 is connected to a splitter input optical fiber jumper assembly 358. The connection between these two jumper assemblies may be made by any means. In one non-limiting example, the splitter input optical fiber jumper assembly 358 is terminated with a port (i.e., an adapter, such as an LC adapter) and the input port fiber optic jumper assembly 335 is terminated with a connector (e.g., an LC connector). In other embodiments, an adapter is used to connect the connector of the splitter input optical fiber jumper assembly 358 to the input port fiber optic jumper assembly 335. As shown by FIG. 5, the pass-through optical fiber jumper assembly and the pass-through port 132 are not used.

The optical signal enters the end-of-line multiport device 300 at the input port 134, propagates through the input port fiber optic jumper assembly 335 and the splitter input optical fiber jumper assembly 358, and enters the splitter 248 at the splitter input 255. This end-of-line optical signal is then split eight ways by the splitter and provided at the output ports 149A-149H.

Figure 6:
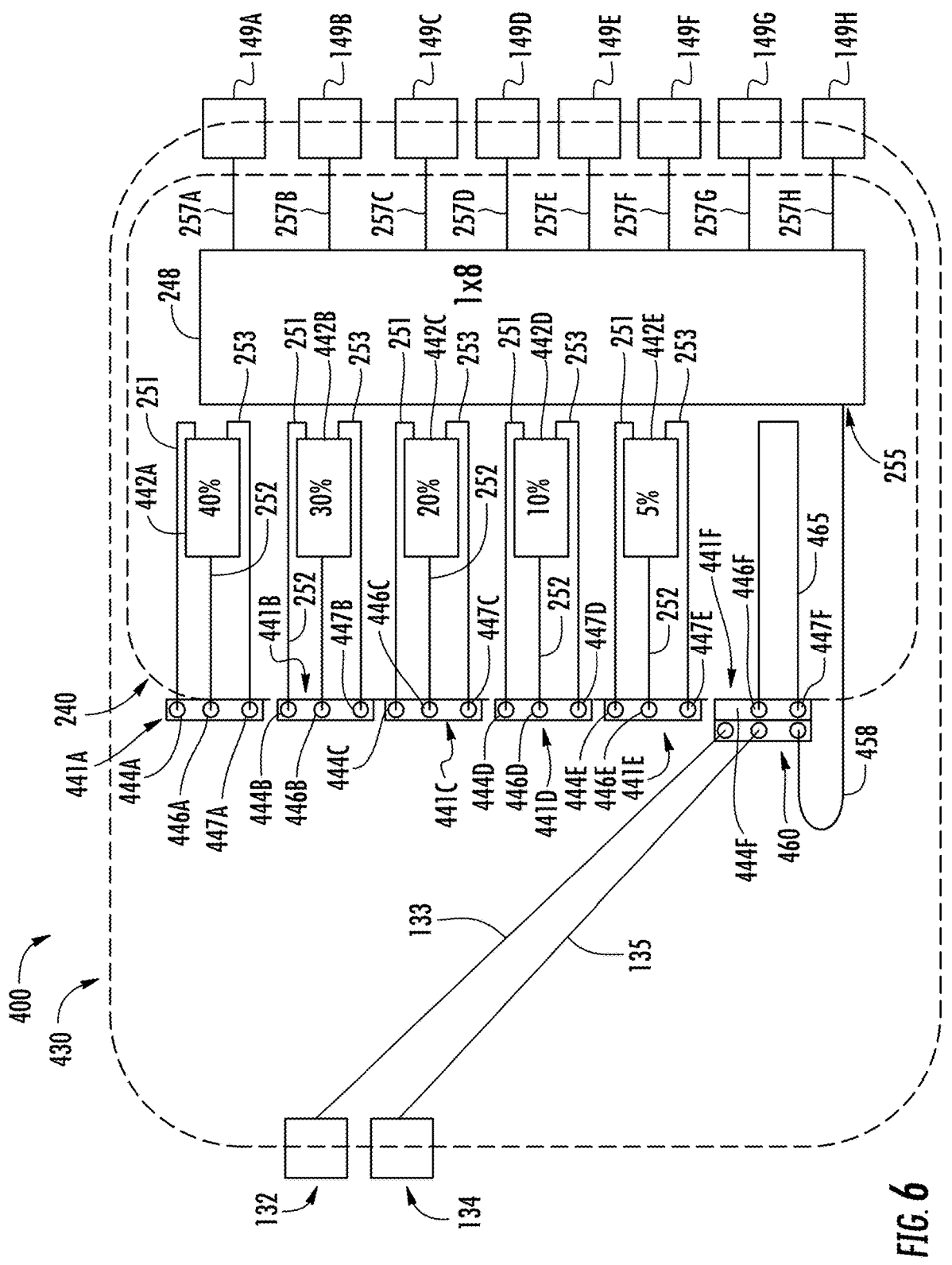
FIG. 6 illustrates another example optical device in an "end-of-line" configuration having a selected splitting ratio that is selected within an enclosure of the optical device and uses a 1×M splitter according to one or more embodiments disclosed and illustrated herein.

Other end-of-line configurations are also possible. Referring now to FIG. 6, another example multiport device 400 is illustrated. The multiport device 400 is operable to be configured as an end-of-line device in the field by the craft. The example multiport device 400 includes a plurality of couplers 442A-442F corresponding to a plurality of sets of splitting ratio selection ports 441A-441F. However, coupler 442F is configured as a short-circuit coupler that does not split the optical signal. Rather, it includes a loop-back optical fiber 465. In the illustrated embodiment, each set of splitting ratio selection ports is configured as a triplex port such that the plurality of sets of splitting ratio selection ports have a plurality of coupler pass-through ports 444A-444F, a plurality of coupler input ports 446A-446F, and a plurality of coupler splitter input ports 447A-447F.

Set of splitting ratio selection ports 441F (i.e., short circuit ports) may not have a coupler pass-through port 444F, or it may have a coupler pass-through port 444F configured as a blank or dummy port. The loop-back optical fiber 465 is terminated at the coupler input port 446F and the coupler splitter input port 447F such that an optical signal entering the coupler input port 446F is provided directly to the coupler splitter input port 447F and thus directly to the splitter input 255 of the splitter 248.

The input port fiber optic jumper assembly 135, the pass-through port fiber optic jumper assembly 133, and a splitter input optical fiber jumper assembly 458 are terminated by a triplex connector 460 (e.g., a triplex LC connector) for mating with an individual set of splitting ratio selection ports 441. The example of FIG. 6 is shown in the end-of-line configuration wherein the triplex connector 460 is connected to the triplex short circuit ports 441F such that the optical signal is passed directly to the splitter 248 and bypasses the 1×2 couplers 442A-442E.

Figure 7:
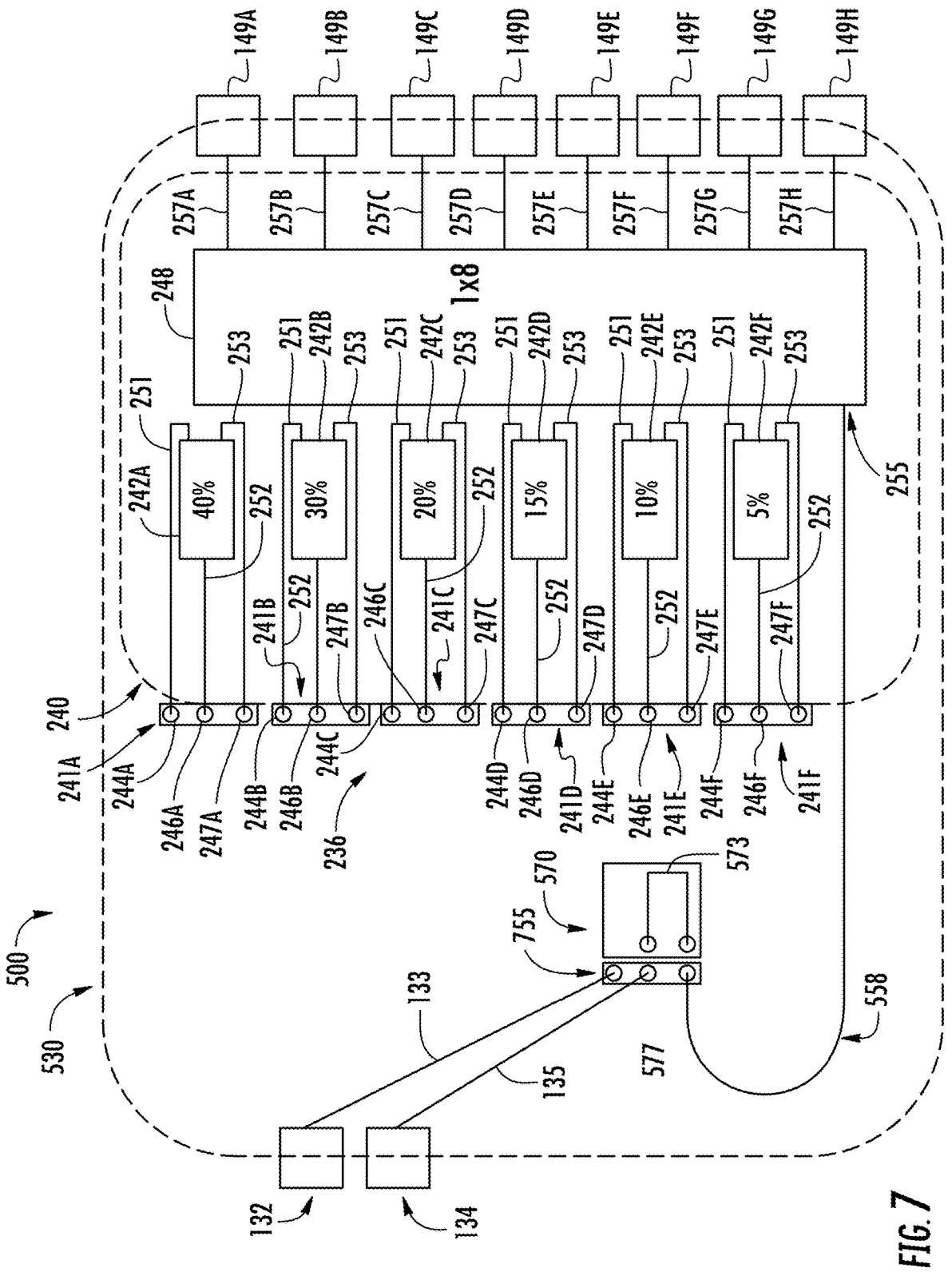
FIG. 7 illustrates another example optical device in an "end-of-line" configuration having a selected splitting ratio that is selected within an enclosure of the optical device and uses a 1×M splitter and a short circuit coupler according to one or more embodiments disclosed and illustrated herein.

FIG. 7 illustrates another single-input splitter embodiment of a multiport device 500. In this embodiment, a short circuit coupler 570 configured as an adapter (e.g., a triplex short circuit port) having an integrated loop-back fiber or waveguide 573. The input port fiber optic jumper assembly 135, the pass-through port fiber optic jumper assembly 133, and a splitter input optical fiber jumper assembly 558 are terminated by a triplex connector 755 (e.g., a triplex LC connector) for mating with the short circuit coupler 570. When the triplex connector 755 is mated to the short circuit coupler 570, the input port fiber optic jumper assembly 135 is in optical communication with a first end of the integrated loop-back fiber or waveguide 573 and the splitter input optical fiber jumper assembly 558 is in optical communication with a second end of the integrated loop-back fiber or waveguide 573. Thus, the input port fiber optic jumper assembly 135 is in optical communication with the splitter input 255 of the splitter 248.

The embodiments described above enable a craft to configure an optical device by opening a housing to gain access to an enclosure where optical connections and field configurations are made. However, embodiments of the present disclosure also include field-configurable optical devices wherein the configuration is made such that access to an internal enclosure is not needed.

Referring to FIGS. 8 and 9, an example system 600 for an optical communication network is illustrated. FIG. 8 illustrates internal components of the system 600 and FIG. 9 illustrates example physical hardware components of the system 600. The system 600 generally includes a terminated access point 106A engineered into a distribution cable 70 similar to as described above with respect to FIG. 2. A tether assembly 107 provides mid-span access to optical fibers of the distribution cable 70. As a non-limiting example, the tether assembly 107 comprises a two-fiber pigtail connectorized with a duplex hardened connector hanging from the access point.

The example system further includes an optical device configured as a multiport device 601 and an intermediate cable assembly 680 comprising a cable 110, a pass-through optical fiber 687 and an input optical fiber 689 within the cable 110, and a connector 682 for mating with the multiport device 601 (FIG. 8). The example intermediate cable assembly 680 also includes a first connector 109 for mating with the connector of the tether assembly 107. The connector 682 may be a duplex connector that provides both an input connector 684 and a pass-through connector 683.

Referring to FIG. 8, the multiport device 601 includes a housing 630 that defines an enclosure 631. Disposed within the enclosure are a splitter 148 and a plurality of couplers 642A-642F. More or fewer couplers may be provided. Further, any N×M splitter may be provided, and embodiments are not limited to the 6×8 splitter shown in FIG. 8. As described above with respect to FIG. 3A, the plurality of couplers 642A-642F have different power splitting ratios, and may be asymmetric couplers as shown in FIG. 8. Each coupler 642 includes an input 652, a first output 651, and a second output 652.

A plurality of sets of splitting ratio selection ports 641A-641F are provided at an exterior surface of the housing 630 of the multiport device 601. Because these splitting ratio selection ports are external, they should be hardened ports to withstand the environment in which the multiport device 601 will be deployed.

The plurality of sets of splitting ratio selection ports 641A-641F comprise a plurality of coupler input ports 646A-646F and a plurality of coupler pass-through ports 644A-644F. The plurality of coupler input ports 646A-646F and the plurality of coupler pass-through ports 644A-644F (i.e., the plurality of sets of splitting ratio selection ports 641A-641F) may be configured as hardened simplex ports or hardened duplex ports, for example. As a non-limiting example the plurality of sets of splitting ratio selection ports 641A-641F may be configured as LC adapters.

Rather than accessing an interior enclosure 631 of the multiport device 601, the craft connects the connector 682 of the intermediate cable assembly 680 to the set of splitting ratio selection ports 641 corresponding to the coupler 642 having the desired power splitting ratio. In the example illustrated by FIG. 8, the connector 682 of the intermediate cable assembly 680 will be connected to set of splitting ratio selection ports 641C. This connects the pass-through connector 683 to the coupler pass-through port 644C and the input connector 684 to the coupler input port 646C. Thus, the pass-through optical fiber 687 and the input optical fiber 689 will be in optical communication with the first output 651 of coupler 642C and the input 652 of coupler 642C, respectively.

To change the power splitting ratio of the multiport device 601, the craft simply may connect the connector 682 to a different set of splitting ratio selection ports 641.

FIG. 10 illustrates another example of a multiport device 701 wherein the plurality of coupler input ports 746A-746F and the plurality of coupler pass-through ports 744A-744F are provided by a multi-fiber port 741 at an exterior surface of the housing 730. In the illustrated embodiment, the multi-fiber port 741 is a twelve-fiber, hardened port. The selection of the desired power splitting ratio is achieved through addressing the correct fibers in a corresponding hardened multi-fiber connector 782 of the intermediate cable assembly 780. No other further configuration of the multi-port device 701 is needed. As shown in FIG. 10, the optical fibers of the intermediate cable assembly 680 are in positions such that coupler 742A is selected, providing a power splitting ratio of 40%/60% for the multiport device 701.

Each coupler of the plurality of couplers 742A-742F has an input 752, a first output 751, and a second output 753. The second outputs 753 of the plurality of couplers 742A-742F are in optical communication with the splitter inputs 758 of the splitter 148. In some embodiments, the second outputs 753 and the splitter inputs 758 are connectorized fiber pigtails and make with one another. In other embodiments, the plurality of couplers 742A-742F and the splitter 148 are provided on the same PLC chip and thus the second outputs 753 of the plurality of couplers 742A-742F may be provided directly to the splitter 148 by waveguides integrated on or within the PLC chip.

Externally configurable optical devices employing a 1×M splitter are also disclosed. Referring now to FIG. 11, another multiport device 801 device having a multi-fiber port 741 at an exterior surface of a housing 830 is illustrated. The multi-fiber port 741 is configured to receive a multi-fiber connector 782 for selecting a power splitting ratio as described above with respect to FIG. 10. However, rather than a 6×8 splitter, the example multiport device 801 employs a 1×8 splitter 248. However, it should be understood that the splitter may have more or fewer outputs (i.e., a 1×M splitter).

The multiport device 801 has a plurality of couplers 742A-742F similar to as shown in FIG. 10. However, the second outputs 853 of the plurality of couplers 742A-742F are routed to coupler output ports 847A-847F at the exterior surface of the housing 830. The coupler output ports 847A-847F may take on any configuration. However, they should be hardened because they are exposed to the environment being located at the exterior surface of the housing 830. A splitter input port 856 is also provided at the exterior surface of the housing 830. The splitter input port 856, which should also be hardened, is in optical communication with a splitter input optical fiber jumper assembly 858 that is optically coupled to the input 255 of the splitter 248. To connect the second output 853 of a desired optical coupler 742, the craft will connect an end of a splitter input jumper 859 to a desired coupler output port 847. As a non-limiting example, the splitter input jumper 859 is configured as a loop-back fiber that optically couples the splitter input port 856 to the selected coupler output port 847. The splitter input jumper 859 may include connector on each end that plug into the splitter input port 856 and the selected coupler output port 847. In the example of FIG. 11, the craft has connected an end of the splitter input jumper 859 to coupler output port 847A, and addressed the optical fibers of the intermediate cable assembly 680 in the multi-fiber connector 782 so that they are in optical communication with the input 752 and the first output 751 of coupler 742A. Thus, the multiport device 801 of FIG. 11 is configured to have a power splitting ratio of 40%/60%.

In some embodiments, there is no splitter input port 856. Rather, the splitter input optical fiber jumper assembly 858 is configured as a pigtail that extends out of the housing 830 for connection to a coupler output port 847. A gasket or other sealing member may be disposed between the splitter input optical jumper assembly 585 and the housing to provide environmental sealing.

The hardened coupler output ports 847A-847F and the hardened splitter input port 856 are large and may take up a lot of space on the housing 830. In some embodiments, the splitter input ports and the common splitter input port may be non-hardened and sealed within a recess. Referring now to FIG. 12, another multiport device 901 is illustrated. The coupler output ports 947A-947F and the splitter input port 956 are non-hardened and disposed on a recessed face 997 within a recess 990 of the housing 930. A cover 992 seals the recess 990 and the ports therein from the environment. Thus, the coupler output ports 947A-947F and the splitter input port 956 may be non-hardened and smaller than the coupler output ports 847A-847F and the splitter input port 856 shown in FIG. 11.

A splitter input jumper 959 having a non-hardened connector optically couples the splitter input 956 to a selected coupler output port 847. The splitter input jumper 959 is also sealed within the recess 990.

FIG. 13 shows an example close-up perspective view of the recess 990, cover 992 and the splitter input jumper 959 of the multiport device 901 depicted by FIG. 12. In the example of FIG. 13, the splitter input jumper 959 is configured as a plug having two ferrules 958 extending from a plug housing that are coupled to an internal splitter optical fiber (not shown).

The recess 990 is within a face of the housing 930, and defines a recessed face 997. In the illustrated example, the coupler output ports 947A-947F are split-sleeve receptacles that surround a central splitter input port 956 that is also configured as a split-sleeve receptacle. The split-sleeve receptacles are configured to receive the ferrules 958 of the splitter input jumper 959 to optically couple the splitter input port 956 to a selected coupler output port 947. It should be understood that ports other than split-sleeve receptacles may be used for the splitter input port 956 and the coupler output ports 947A-947F.

In the illustrated embodiment, a gasket surrounds the recess 990 opening to provide environmental sealing. The cover 992 is configured as a plate that is disposed over the recess. Fastener members 995 of the cover 992 may cooperate with fastener members 994 of the housing to secure the cover 992 to the housing 930. As a non-limiting example, fastener members 994 may be threaded bores, fastener members 995 may be holes. Screws may be disposed through fastener members 995 and screwed into fastener members 994 to secure the cover 992 to the housing 930. The cover 992 may also include a jumper recess 998 to provide space for the splitter input jumper 959. It should be understood that in other embodiments the jumper recess is not provided.

Referring now to FIG. 14, another non-enterable, field-configurable multiport device 1001 is illustrated. Rather than providing a recess as illustrated by FIGS. 12 and 13, the embodiment of FIG. 14 provides coupler output ports 1047A-1047F and a splitter input port 1056 that are sealed within the enclosure 1031. The splitter input jumper is configured as an actuator 1059 (e.g. a knob, a lever, a dial, and the like) configured such that actuation of the actuator changes which coupler output port 1047 is optically coupled to the common splitter input port. The actuator 1059 includes an optical fiber for optically coupling the desired coupler output port 1047 to the common splitter input port As a non-limiting example, the actuator 1059 may be configured as a knob that is partially external to the housing 1030, and rotation of the knob indexes which coupler output port 1047 is selected.

In some embodiments, the optical device may include wavelength selection components within the enclosure in addition to or in lieu of the 1×2 couplers disclosed herein. The wavelength selection components may enable the selection of different channels or subsets of channels in a wavelength division multiplexing (WDM) application. For example any of the internally accessible or externally accessible means for selecting a 1×2 coupled described herein may also be used in the same manner to select a wavelength selection component to select different channels or subsets of channels in a WDM application. As a non-limiting example, any one of the optical couplers 142A-142F of FIG. 3A may be replaced with a wavelength selection component operable to pass only the desired wavelength(s).

As one non-limiting example, the optical device may be employed in a coarse wavelength division multiplexing scheme. Referring to FIG. 3A, each of the optical couplers 142A-142F may be replaced with wavelength selection devices comprising a filter that passes one wavelength to the splitter 148. The craft may use the input port fiber optic jumper assembly 135 and the pass-through port fiber optic jumper assembly 133 to make the wavelength selection in the manner described above with respect to optical power selection. It should be understood that any of the optical devices described herein may be used to select wavelengths using wavelength selection devices.

As another non-limiting example, the optical device may be employed in a dense wavelength division multiplexing scheme. Referring to FIG. 3A, each of the optical couplers 142A-142F may be replaced with wavelength selection devices comprising a filter that passes a plurality of wavelengths to the splitter 148. The plurality of wavelengths is a subset of the wavelengths entering the optical device. Thus, each wavelength selection device passes one band of wavelengths. The craft may use the input port fiber optic jumper assembly 135 and the pass-through port fiber optic jumper assembly 133 to make the wavelength selection in the manner described above with respect to optical power selection. In such embodiments, a subscriber may have another wavelength selection device at the premises to select the single wavelength for the premises.

It should now be understood that embodiments of the present disclosure are directed to optical devices, such as multiport devices, and methods for configuring a power splitting ratio of the optical device in the field. By including multiple 1×2 couplers within the optical device, the desired power splitting ratio may be established in the field rather than at the factory. This enables the manufacturer to produce and inventory fewer unique part numbers, which reduces costs for the manufacturer. Further, fewer unique part numbers are needed to be carried by the craft to a work site, which can help avoid confusion and add flexibility to implementation of the optical communication network.

Although the disclosure has been illustrated and described herein with reference to explanatory embodiments and specific examples thereof, it will be readily apparent to those of ordinary skill in the art that other embodiments and examples can perform similar functions and/or achieve like results. All such equivalent embodiments and examples are within the spirit and scope of the disclosure and are intended to be covered by the appended claims. It will also be apparent to those skilled in the art that various modifications and variations can be made to the concepts disclosed without departing from the spirit and scope of the same. Thus, it is intended that the present application cover the modifications and variations provided they come within the scope of the appended claims and their equivalents.

The invention claimed is:

1. A field-configurable optical device comprising:
   a housing defining an enclosure;
   a splitter disposed within the enclosure and comprising one or more splitter inputs and a plurality of splitter outputs;
   a plurality of couplers within the enclosure, each coupler comprising an input, a first output, and a second output, wherein:
      each coupler has a power split ratio between the first output and the second output that is different from other couplers of the plurality of couplers; and
      the second output of at least one coupler of the plurality of couplers is in optical communication with at least one splitter input of the one or more splitter inputs;
   a plurality of sets of split-ratio selection ports located at an exterior surface of the housing, wherein:
      each set of split-ratio selection ports comprises a coupler input port and a coupler pass-through port; and
      the coupler input port is in optical communication with the input of an individual coupler, and the coupler pass-through port is in optical communication with the first output of the individual coupler; and
   a plurality of output ports located at the housing, wherein the plurality of output ports are in optical communication with the plurality of splitter outputs of the splitter, wherein the plurality of sets of split-ratio selection ports and the plurality of couplers are configured such that the power split ratio of the field-configurable optical device is established by connecting an input optical fiber to the coupler input port of a selected set of split-ratio selection ports of the plurality of sets of split-ratio selection ports, and connecting a pass-through optical fiber to the coupler pass-through port of the selected set of split-ratio selection ports of the plurality of sets of split-ratio selection ports.

2. The field-configurable optical device of claim 1, wherein the field-configurable optical device is a multiport device.

3. The field-configurable optical device of claim 1, wherein the plurality of couplers is a plurality of asymmetric couplers.

4. The field-configurable optical device of claim 1, wherein each set of split-ratio selection ports of the plurality of sets of split-ratio selection ports comprises a pair of ports.

5. The field-configurable optical device of claim 4, wherein the pair of ports is a pair of LC adapters.

6. The field-configurable optical device of claim 1, wherein the plurality of sets of split-ratio selection ports is provided by a multi-fiber connector.

7. The field-configurable optical device of claim 1, wherein the splitter and the plurality of couplers are provided by one or more of a planar lightwave circuit, a fused biconic taper coupler, and a thin film coupler.

8. The field-configurable optical device of claim 1, wherein the one or more splitter inputs of the splitter comprises a plurality of splitter inputs.

9. The field-configurable optical device of claim 1, wherein the one or more splitter inputs of the splitter comprises a single splitter input.

10. The field-configurable optical device of claim 9, further comprising:

a plurality of coupler output ports, wherein the plurality of coupler output ports is in optical communication with the second output of the plurality of couplers; and a splitter input port in optical communication with the single splitter input.

11. The field-configurable optical device of claim 10, further comprising a splitter input jumper connected to the splitter input port and an individual coupler output port of the plurality of coupler output ports.

12. The field-configurable optical device of claim 11, wherein the splitter input jumper comprises a loop-back optical fiber.

13. The field-configurable optical device of claim 11, wherein the plurality of coupler output ports and the splitter input port are located at the exterior surface of the housing.

14. The field-configurable optical device of claim 11, wherein:

the housing defines a recess comprising a recessed face;

the plurality of coupler output ports and the splitter input port are located at the recessed face;

the splitter input jumper is disposed within the recess; and the field-configurable optical device further comprises a cover operable to cover the recess.

15. The field-configurable optical device of claim 14, further comprising a gasket surrounding the recess, wherein the gasket and the cover seals the recess from the environment.

16. The field-configurable optical device of claim 11, wherein the splitter input jumper comprise a plug having a plug housing and an optical fiber disposed within the plug housing.

17. The field-configurable optical device of claim 11, wherein the splitter input jumper comprises an actuator configured such that actuation of the actuator changes the individual coupler output port of the plurality of coupler output ports.

18. The field-configurable optical device of claim 1, wherein each coupler of the plurality of couplers is disposed within its own housing within the enclosure.

19. A system for an optical communications network, the system comprising:

a cable assembly comprising a pass-through optical fiber, an input optical fiber, and a multi-fiber connector terminating the pass-through optical fiber and the input optical fiber;

an optical device comprising:

a housing defining an enclosure;

a splitter disposed within the enclosure and comprising one or more splitter inputs and a plurality of splitter outputs;

a plurality of couplers within the enclosure, each coupler comprising an input, a first output, and a second output, wherein:

each coupler has a power split ratio between the first output and the second output that is different from other couplers of the plurality of couplers; and the second output of at least one coupler of the plurality of couplers is in optical communication with at least one splitter input of the one or more splitter inputs;

a plurality of sets of split-ratio selection ports located at an exterior surface of the housing, wherein:

each set of split-ratio selection ports comprises a coupler input port and a coupler pass-through port; and the coupler input port is in optical communication with the input of an individual coupler, and the coupler pass-through port is in optical communication with the first output of the individual coupler; and a plurality of output ports located at the housing, wherein the plurality of output ports are in optical communication with the plurality of splitter outputs of the splitter, wherein the plurality of sets of split-ratio selection ports and the plurality of couplers are configured such that the power split ratio of the field-configurable optical device is established by connecting the multi-fiber connector of the cable assembly to the coupler input port and the coupler pass-through port of a selected set of split-ratio selection ports.

20. The field-configurable optical device of claim 19, wherein the field-configurable optical device is a multiport device.

21. The field-configurable optical device of claim 19, wherein the plurality of couplers is a plurality of asymmetric couplers.

22. The field-configurable optical device of claim 19, wherein each set of split-ratio selection ports of the plurality of sets of split-ratio selection ports comprises a pair of ports.

23. The field-configurable optical device of claim 22, wherein the pair of ports is a pair of LC adapters.

24. The field-configurable optical device of claim 19, wherein the plurality of sets of split-ratio selection ports is provided by a multi-fiber connector.

25. The field-configurable optical device of claim 19, wherein the splitter and the plurality of couplers are provided by one or more of a planar lightwave circuit, a fused biconic taper coupler, and a thin film coupler.

26. The field-configurable optical device of claim 19, wherein the one or more splitter inputs of the splitter comprises a plurality of splitter inputs.

27. The field-configurable optical device of claim 19, wherein the one or more splitter inputs of the splitter comprises a single splitter input.

28. The field-configurable optical device of claim 27, further comprising:

a plurality of coupler output ports, wherein the plurality of coupler output ports is in optical communication with the second output of the plurality of couplers; and a splitter input port in optical communication with the single splitter input.

29. The field-configurable optical device of claim 28, further comprising a splitter input jumper connected to the splitter input port and an individual coupler output port of the plurality of coupler output ports.

30. The field-configurable optical device of claim 29, wherein the splitter input jumper comprises a loop-back optical fiber.

31. The field-configurable optical device of claim 29, wherein the plurality of coupler output ports and the splitter input port are located at the exterior surface of the housing.

32. The field-configurable optical device of claim 29, wherein:

the housing defines a recess comprising a recessed face;

the plurality of coupler output ports and the splitter input port are located at the recessed face;

the splitter input jumper is disposed within the recess; and the field-configurable optical device further comprises a cover operable to cover the recess.

33. The field-configurable optical device of claim 32, further comprising a gasket surrounding the recess, wherein the gasket and the cover seals the recess from the environment.

34. The field-configurable optical device of claim 29, wherein the splitter input jumper comprise a plug having a plug housing and an optical fiber disposed within the plug housing.

35. The field-configurable optical device of claim 29, wherein the splitter input jumper comprises an actuator configured such that actuation of the actuator changes the individual coupler output port of the plurality of coupler output ports.

36. The field-configurable optical device of claim 19, wherein each coupler of the plurality of couplers is disposed within its own housing within the enclosure.

37. A method of configuring a field-configurable optical device, the method comprising:

connecting an input connector of a cable assembly to a coupler input port of an individual set of splitting ratio selection ports among a plurality of sets of splitting ratio selection ports at an exterior surface of a housing of the field-configurable optical device; and connecting a pass-through connector of the cable assembly to a coupler pass-through port of the individual set of splitting ratio selection ports, wherein:

the plurality of sets of splitting ratio selection ports is in optical communication with a plurality of couplers, each coupler of the of the plurality of couplers has a power splitting ratio that is different from other couplers of the plurality of couplers such that selection of the individual set of splitting ratio selection port establishes a power splitting ratio of the optical device, and moving the input connector and the pass-through connector from a first set of splitting ratio selection ports to a second set of splitting ratio selection ports changes the power splitting ratio of the field-configurable optical device.

38. The method of claim 37, wherein:

the input connector and the pass-through connector of the cable assembly is provided by a multifiber connector;

the plurality of sets of splitting ratio ports is provided by a multifiber port configured to mate with the multifiber connector; and a position of an input fiber of the cable assembly within the multifiber connector and a position of a pass-through fiber of the cable assembly within the multifiber connector establishes which coupler of the plurality of couplers is selected to establish the power splitting ratio of the field-configurable optical device.

39. The method of claim 37, further comprising connecting a splitter input jumper to a splitter input port and an individual coupler output port of a plurality of coupler output ports.

40. The method of claim 39, further comprising removing a cover coupled to the housing to access a recess, wherein the splitter input port, the plurality of coupler output ports, and the splitter input jumper are within the recess.

41. The method of claim 37, further comprising moving an actuator to optically couple a splitter input port to an individual coupler output port of a plurality of coupler output ports.

* * * * *